US011935047B2

(12) United States Patent
Perkins et al.

(10) Patent No.: US 11,935,047 B2
(45) Date of Patent: *Mar. 19, 2024

(54) ENHANCED FEEDBACK EXPOSURE FOR MERCHANTS BASED ON TRANSACTION METADATA

(71) Applicant: Capital One Services, LLC, McLean, VA (US)

(72) Inventors: Wesley Perkins, Henrico, VA (US); Venkata Satya Sriram Kalyan Namuduri, Glen Allen, VA (US); David Ross, Richmond, VA (US); Andrew Coulson, Washington, DC (US); Hunter Roberts, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/817,285

(22) Filed: Aug. 3, 2022

(65) Prior Publication Data

US 2022/0374879 A1 Nov. 24, 2022

Related U.S. Application Data

(63) Continuation of application No. 17/176,663, filed on Feb. 16, 2021, now Pat. No. 11,443,312.

(51) Int. Cl.
*G06Q 20/40* (2012.01)
*G06Q 20/12* (2012.01)
*G06Q 20/38* (2012.01)

(52) U.S. Cl.
CPC ......... *G06Q 20/389* (2013.01); *G06Q 20/12* (2013.01); *G06Q 20/385* (2013.01); *G06Q 20/40* (2013.01); *G06Q 20/4014* (2013.01)

(58) Field of Classification Search
CPC .... G06Q 20/389; G06Q 20/12; G06Q 20/385; G06Q 20/40; G06Q 20/4014
See application file for complete search history.

(56) References Cited

U.S. PATENT DOCUMENTS 6,254,000 B1 7/2001 Degen et al.
7,962,424 B1 6/2011 Colosso et al.
(Continued)

FOREIGN PATENT DOCUMENTS

CN 108566641 A * 9/2018 ............. G06Q 20/20
CN 108566641 A 9/2018
(Continued)

OTHER PUBLICATIONS

J. Brindtha, K. R. Hithaeishini, R. Komala, G. Abirami, U. Aru; Identification and detecting of attacker in a purchase portal using honeywords, Mar. 1, 2017, IEEE, web, 389-393 (Year: 2017).*
(Continued)

*Primary Examiner* — I Jung Liu
(74) *Attorney, Agent, or Firm* — Banner & Witcoff, Ltd.

(57) ABSTRACT

Methods, systems, and apparatuses are described herein for the direct sharing and use of transaction data separately from transaction authorization processes. Transaction metadata associated with a transaction may be received and validated. Authorization information corresponding to the transaction may be received. The degree to which the transaction metadata is tested may be based on a predicted time of receipt of the authorization information. The transaction metadata and authorization information may be correlated. A computing device may determine whether to authorize the financial transaction based on the authorization information and the correlated transaction metadata. All or portions of the transaction metadata may be provided to one or more users after the transaction has been authorized or denied.

20 Claims, 11 Drawing Sheets

(56) References Cited

U.S. PATENT DOCUMENTS

| | | |
|---|---|---|
| 8,352,315 B2 | 1/2013 | Faith et al. |
| 8,606,714 B1 | 12/2013 | Cameo et al. |
| 8,694,347 B2 | 4/2014 | Kennis et al. |
| 8,820,633 B2 | 9/2014 | Bishop et al. |
| 8,898,762 B2 | 11/2014 | Kang |
| 9,031,877 B1 | 5/2015 | Santhana et al. |
| 9,117,230 B2 | 8/2015 | Joao |
| 9,195,985 B2 | 11/2015 | Domenica et al. |
| 9,680,946 B2 | 6/2017 | Angeles |
| 9,697,508 B1 | 7/2017 | Ramalingam |
| 10,423,959 B2 | 9/2019 | Douglas et al. |
| 10,482,467 B1 | 11/2019 | Samitt et al. |
| 11,270,311 B1 | 3/2022 | Jass |
| 2001/0051919 A1 | 12/2001 | Mason |
| 2002/0091634 A1 | 7/2002 | Eubanks |
| 2003/0023550 A1 | 1/2003 | Lee |
| 2003/0040990 A1 | 2/2003 | Lee et al. |
| 2003/0065616 A1 | 4/2003 | O'Donnell |
| 2004/0210531 A1 | 10/2004 | Barron et al. |
| 2005/0144130 A1 | 6/2005 | Staniar et al. |
| 2005/0283437 A1 | 12/2005 | McRae et al. |
| 2007/0022058 A1 | 1/2007 | Labrou et al. |
| 2007/0083459 A1 | 4/2007 | Eubanks |
| 2007/0100745 A1 | 5/2007 | Keiser et al. |
| 2007/0219900 A1 | 9/2007 | MacGuire |
| 2007/0282674 A1 | 12/2007 | Gomes et al. |
| 2007/0288641 A1 | 12/2007 | Lee et al. |
| 2008/0263582 A1 | 10/2008 | Okamoto et al. |
| 2008/0270293 A1 | 10/2008 | Fortune et al. |
| 2009/0063276 A1 | 3/2009 | Ekechukwu |
| 2009/0106151 A1 | 4/2009 | Nelsen et al. |
| 2009/0222369 A1 | 9/2009 | Zoldi et al. |
| 2011/0022517 A1 | 1/2011 | Hammad |
| 2011/0066493 A1 | 3/2011 | Faith et al. |
| 2011/0302011 A1 | 12/2011 | Yoder et al. |
| 2012/0221468 A1 | 8/2012 | Kumnick et al. |
| 2012/0239574 A1* | 9/2012 | Smith ............... G06Q 20/4014 705/44 |
| 2013/0024339 A1 | 1/2013 | Choudhuri et al. |
| 2013/0124417 A1 | 5/2013 | Spears et al. |
| 2013/0232069 A1 | 9/2013 | Leyva et al. |
| 2014/0046846 A1* | 2/2014 | Dogin ............... G06Q 20/401 705/44 |
| 2014/0074675 A1 | 3/2014 | Calman et al. |
| 2014/0188728 A1 | 7/2014 | Dheer et al. |
| 2014/0258118 A1 | 9/2014 | Scott et al. |
| 2014/0258119 A1 | 9/2014 | Canis et al. |
| 2015/0073981 A1 | 3/2015 | Adjaoute |
| 2015/0081462 A1 | 3/2015 | Ozvat et al. |
| 2015/0170148 A1 | 6/2015 | Priebatsch |
| 2015/0302464 A1 | 10/2015 | Iannace et al. |
| 2015/0332237 A1 | 11/2015 | Aaron et al. |
| 2015/0348167 A1 | 12/2015 | McDermott |
| 2015/0379514 A1 | 12/2015 | Poole |
| 2016/0034932 A1 | 2/2016 | Sion et al. |
| 2016/0086185 A1 | 3/2016 | Adjaoute |
| 2016/0180466 A1 | 6/2016 | Caldwell |
| 2016/0328710 A1 | 11/2016 | Britton et al. |
| 2018/0096350 A1* | 4/2018 | Groarke ............... G06F 16/2455 |
| 2018/0158044 A1 | 6/2018 | Beck et al. |
| 2018/0218345 A1 | 8/2018 | Spratt et al. |
| 2018/0374152 A1 | 12/2018 | Dominguez |
| 2019/0188579 A1 | 6/2019 | Manoharan et al. |
| 2019/0370812 A1 | 12/2019 | Kandasamy et al. |
| 2019/0392440 A1 | 12/2019 | Ederle et al. |
| 2020/0058030 A1 | 2/2020 | Adjaoute |
| 2020/0104843 A1 | 4/2020 | Bhasin |
| 2020/0134628 A1 | 4/2020 | Jia et al. |
| 2020/0160286 A1 | 5/2020 | Vukich et al. |
| 2020/0193438 A1 | 6/2020 | Cohn et al. |
| 2020/0211020 A1 | 7/2020 | Allbright et al. |
| 2020/0311734 A1 | 10/2020 | Mardikar et al. |
| 2020/0322350 A1 | 10/2020 | McCarter et al. |
| 2020/0356980 A1 | 11/2020 | Singh et al. |
| 2020/0380523 A1 | 12/2020 | Agrawal et al. |
| 2022/0027915 A1 | 1/2022 | Cameron et al. |
| 2023/0289808 A1 | 9/2023 | Kolchin |

FOREIGN PATENT DOCUMENTS

| | | |
|---|---|---|
| WO | 2005077066 A2 | 8/2005 |
| WO | 2005101713 A2 | 10/2005 |
| WO | 2018035024 A1 | 2/2018 |
| WO | 2019137050 A1 | 7/2019 |

OTHER PUBLICATIONS

Apr. 1, 2021—(US) Non-Final Office Action—U.S. Appl. No. 17/176,642.

Hsu et al., "An Online Fraud-Resistant Technology for Credit Card E-Transactions," Kao Yuan University, Dept. of Engineering, 2009 (Year: 2009).

Rimpal R. Popat, "A Survey on Credit Card Fraud Detection using Machine Learning," 2nd International Conference on Trends in Electronics and Informatics, IEEE Conference, 2018 (Year: 2018).

Jul. 22, 2021—Notice of Allowance—U.S. Appl. No. 17/176,642.

Mar. 1, 2017, J. Brindtha, K.R. Hithaeishini, R. Komala, G. Abirami, U. Aru, Identification and Detecting of Attacker in a Purchase Portal Using Honeywords, IEEE, Web 389-393.

Apr. 29, 2022—(WO) International Search Report & Written Opinion—App. No. PCT/US2022/016485.

Pavithra, "Credit Card Processing and Payment Systems" International Journal of Modern Engineering Research, 2249-6645, vol. 7, Issue 2, 2017.

* cited by examiner

Payment Information (1101)

- Credit Card Number (1103a)
- Credit Card CVV (1103b)
- Total Payment Amount (1103c)

Transaction Metadata (1102)

- Listing of Goods/Services (1104a)
- Prices of Goods/Services (1104b)
- Transaction Location (1104c)
- User Device IP Address (1104d)
- User Device MAC Address (1104e)

FIG. 11

ENHANCED FEEDBACK EXPOSURE FOR MERCHANTS BASED ON TRANSACTION METADATA

CROSS REFERENCE TO RELATED APPLICATIONS

This application is a continuation of U.S. patent application Ser. No. 17/176,663, filed Feb. 16, 2021, titled "ENHANCED FEEDBACK EXPOSURE FOR MERCHANTS BASED ON TRANSACTION METADATA,", which is related to the following U.S. patent applications, filed on the same day:

U.S. patent application Ser. No. 17/176,642, titled "DIRECT DATA SHARE" and filed Feb. 16, 2021;

U.S. patent application Ser. No. 17/176,648, titled "DYNAMIC TRANSACTION METADATA VALIDATION ADJUSTMENT BASED ON NETWORK CONDITIONS" and filed Feb. 16, 2021;

U.S. patent application Ser. No. 17/176,668, titled "PARALLEL TRANSACTION PRE-AUTHORIZATION PLATFORM" and filed Feb. 16, 2021;

U.S. patent application Ser. No. 17/176,673, titled "TRANSACTION RESOLUTION DATA PLATFORM" and filed Feb. 16, 2021.

Each of the related applications is incorporated by reference herein in its entirety for all purposes.

FIELDS OF USE

Aspects of the disclosure relate generally to data transmission, data processing, and transaction authorization. More specifically, aspects of the disclosure may provide for direct sharing and transmission of additional and extensible information in a manner that it can be processed within the timing constraints of a traditional authorization network.

BACKGROUND

The efficient resolution of financial transactions often entails the quick processing of data relating to that transaction. For example, to process a simple transaction (e.g., a user using a credit card to purchase a soda), a wide variety of computing devices must perform steps such as validating a pin number and other identifying details of the credit card, ensuring that the credit card has not exceeded a credit limit, and ensuring that a merchant account associated with the seller of the credit card is trusted to process the transaction. While such decision-making should be accurate (as, after all, mistakes may have severe financial consequences), it must also be reasonably speedy: after all, few users would be willing to wait multiple minutes for a soda purchase to process.

Given that the resolution of financial transactions must be speedy but accurate, conventional payment processing services use limited quantities of data to make authorization decisions. For example, a payment processing decision might be made based on little more than a credit card number, a credit card identifier code, a merchant identifier, and a payment amount. In this way, conventional payment processing decision-making is often quite limited and rudimentary. This has numerous drawbacks, particularly as it relates to fraud detection. For example, because conventional payment processing systems lack information about items and/or services purchased by a transaction, such conventional payment processing systems lack the ability to detect fraud based on which items and/or services are being purchased in a given transaction. As another example, because conventional payment processing systems generally lack detailed information about the location of a purchase (e.g., the location of a smartphone conducting an online purchase), such conventional payment processing systems lack the ability to detect fraud based on location. The limitations of conventional payment processing systems have numerous other drawbacks. For example, because conventional payment processing systems lack detail regarding transactions, issuers of and/or payment networks associated with payment methods (e.g., credit cards) may be incapable of providing customers with detail regarding past transactions, and/or may find it difficult to determine whether chargeback requests are valid. As a particular example, a customer may erroneously issue a chargeback request for a legitimate transaction because the transaction was confusing and/or poorly documented.

That said, users cannot simply choose to provide more data to conventional payment processing systems to remediate the issues identified above. These payment processing systems are controlled by third parties and relied on throughout the market. While it might be desirable to have improved point-of-sale systems provide a wide variety of information to conventional payment processing systems, the conventional payment processing systems must provide common support for all point-of-sale systems, and merchants may be unable or unwilling to replace existing point-of-sale systems with new systems. For example, it may be prohibitively expensive for a convenience store to replace an existing point-of-sale system with a new point-of-sale system (which uses, for example, a different authorization protocol) merely to ensure that the new point-of-sale system is capable of providing detailed information about a transaction, like an identification of particular goods and/or services involved in the transaction, to a conventional payment processing system. In other words, conventional payment processing systems are firmly rooted in legacy hardware, such that changes to those systems can be all but impossible. This is particularly the issue with card-not-present transactions (e.g., online purchases), where a network protocol for such transactions might be limited with respect to what data is shared during an authorization process.

Payment network regulations may require that authorization processing complete within a fixed, and short, period of time. These service level obligations allow companies of all sorts to rely on the third-party payment processing system to efficiently facilitate transactions. Modifications to consider other issues, such as the problems identified above, could cause a transaction processor to fail to meet timing obligations that drive the payment networks.

Aspects described herein may address these and other problems, and generally improve the quality, efficiency, and speed of financial transaction processing systems by offering improved transaction data transmission, authorization, authentication, and decision-making processes.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the direct sharing and use of transaction data in a manner separate from, and parallel to, traditional financial transaction authorization processes. This may have the effect of significantly improving the ability of organizations to ensure transaction authorization, ensure transaction validity, detect fraud, and improve payment card user experiences. According to some aspects, these and other benefits may be achieved by separately sharing additional transaction data in a manner that augments traditional transaction processing while still reaching an authorization result within conventional payment network timing requirements.

Direct Data Share (DDS). Some aspects described herein may describe a direct data share system which augments conventional payment processing systems and which processes, in parallel, transaction data to aid in the transaction decision-making process. As will be described more fully in this disclosure, such a direct data share system may augment conventional payment processing systems to make them more robust and secure. A direct data share system may receive, via a first interface (e.g., a direct data share interface associated with a direct data share component of the system, such as via an Application Programming Interface (API)), transaction metadata comprising one or more data elements. Those data elements may correspond to one or more attributes of a financial transaction. For example, the data elements may comprise data about a location of the financial transaction (e.g., Global Positioning System (GPS) coordinates), goods and/or services to be purchased by the financial transaction, or the like. The transaction metadata may be associated with a concurrent transmission of payment information, for the financial transaction, to a separate payment processing service that ultimately provides authorization data to the system. In other words, when the transaction metadata is received by the direct data share system via the first interface, payment information (e.g., a credit card number) may be being transmitted, or may have already been transmitted, to a payment processing service (e.g., a credit card network, such as VISA). The transaction metadata, once received by the direct data share system, may be validated based on one or more criteria. Such a validation process may comprise comparing a transaction data element to a standard, a set of rules, or other requirements established by the one or more criteria. In this manner, the validation process may ensure, for example, that the received transaction metadata is accurate, reliable, and formatted in a proper manner. Authorization information may be received via a second interface (e.g., a different API or other means for the credit card network to provide information to the system) and from the payment processing service. The authorization information may correspond to the financial transaction that indicates a result of processing the payment information by the payment processing service. In other words, at around the same time that the transaction metadata is received and validated by the direct data share system, the payment processing service may have been processing the payment information in parallel, such that the authorization information may indicate the results of such processing. The direct data share system may then correlate, based at least in part on a validated transaction data element, the validated transaction metadata with the received authorization information corresponding to the financial transaction. In this manner, transaction metadata may be matched with the payment information, such that the correct (and validated) transaction metadata may be correlated with the authorization information (which itself reflects processing by the payment processing service). The direct data share system may then determine whether to authorize the financial transaction based on the authorization information and the correlated transaction metadata. Based on that determination, the system may send an indication of whether the financial transaction was authorized. In this manner, the transaction metadata may be validated and processed in parallel to the processing performed by the payment processing service, augmenting the functionality of the payment processing service in a manner which provides additional transaction information without negatively impairing the speed and/or configuration of the payment processing service.

Dynamic Validation—Dynamic Transaction Metadata Validation Adjustment Based on Network Conditions. Some aspects described herein may provide for a method of adjusting the processing of additional data such that the time to process that additional data meets or beats a predicted time of receipt of authorization network information. In this manner, the additional processing described herein need not add delay to payment processing systems, which might be particularly undesirable where thousands (if not millions) of transactions are being processed on a daily basis. A direct data share system may determine a predicted time of receipt, from a payment processing service that processes payment information (e.g., a credit card network, such as VISA), of authorization information corresponding to a plurality of financial transactions. In other words, this average time of receipt may correspond to a time when such authorization information is expected to be received. That authorization information may indicate processing, by the payment processing service, of the payment information for a corresponding financial transaction. The direct data share system may then select a subset of one or more additional data elements from a set of transaction metadata elements based on determining that validation of the subset of the one or more data elements has an expected processing time that is less than or equal to the average time of receipt of the authorization information. Put simply, this means that the direct data share system may select data elements that can be processed in a sufficiently quick manner, and in any event more quickly than the authorization information is expected to be received. The direct data share system may receive, from a merchant, transaction metadata comprising particular values of the one or more data elements for a given financial transaction. The direct data share system may validate the received transaction metadata based on the selected subset of the one or more data elements. The direct data share system may then receive, from the payment processing service, first authorization information corresponding to the same financial transaction. Then, the direct data share system may determine whether to authorize the financial transaction based on the first authorization information and the validated transaction metadata. Based on determining whether to authorize the financial transaction, the direct data share system may send an indication of whether the financial transaction was authorized.

Some aspects described herein describe a method for processing transaction data in a time-efficient manner (e.g., to meet or beat an expected time when authorization data is to be received from a payment processing network such as a credit card network) by selecting portions of transaction metadata for validation. In this manner, a direct data share system may be configured to select portions of already-received transaction metadata for processing, thereby ensuring that the system does not take an undesirably long time to process that transaction metadata. A direct data share system may receive, via a first interface and from a merchant, transaction metadata comprising a plurality of data elements corresponding to one or more attributes of a financial transaction. That transaction metadata may be associated with a concurrent transmission of payment information, for the financial transaction, to a payment processing service (e.g., a credit card network, such as VISA). That transaction metadata might be undesirably voluminous, such that processing all of the transaction metadata might take an undesirable length of time. For example, processing of the transaction metadata might take so long that it the results of processing would be received too late for use in authorizing a transaction. The direct data share system may select, based on an estimated time of receipt, from a payment processing service that processes payment information, of authorization information corresponding to the financial transaction, a subset of the plurality of data elements to validate based on one or more criteria. Such a subset may be selected by the direct data share system by summing a processing time corresponding to each of the subset of plurality of data elements and determining that the sum is less than the estimated time of receipt. The direct data share system may validate the transaction metadata by validating the subset of the plurality of data elements based on the one or more criteria. The direct data share system may then receive, via the second interface and from the payment processing service, the authorization information. The direct data share system may then determine whether to authorize the financial transaction based on the authorization information and the validated transaction metadata. Based on whether to authorize the financial transaction, the direct data share system may send an indication of whether the financial transaction was authorized.

Merchant Exposure—Enhanced Feedback Exposure for Merchants Based on Transaction Metadata. Some aspects described herein may provide a method that enables merchants to request and receive information related to why transactions were rejected. In this manner, where transactions are authorized using transaction metadata and other additional information, merchants may be given deeper insight into why a particular transaction may have been permitted or rejected. A direct data share system may receive, via a first interface and from a merchant, transaction metadata comprising one or more data elements corresponding to one or more attributes of a financial transaction. The direct data share system may then generate a reference ID for the financial transaction. As will be described in more detail in this disclosure, this reference ID may be used by the merchant for looking up the transaction down the road. The direct data share system may then send, to the merchant, the reference ID. The system may receive, via a second interface and from a payment processing service (e.g., a credit card network, such as VISA), authorization information, corresponding to the financial transaction, that indicates processing of payment information by the payment processing service. The direct data share system may then determine, based on the transaction metadata and the authorization information, that the financial transaction was or was not authorized. One or more reasons why the financial transaction was or was not authorized may be determined. For example, the one or more reasons may comprise an indication that the purchase was suspicious (e.g., a sudden purchase of a luxury item), the location was suspicious (e.g., an unexpected use of a credit card in a foreign country), or the like. An indication that the financial transaction was or was not authorized may be sent to the merchant based on the authorization information and the transaction metadata. A request for additional information may later be received from the merchant. That request may comprise the reference ID. In this manner, the merchant might send a request (e.g., "why was this transaction declined?"), and the request might include a specific identifier of the transaction. Information corresponding to the determined one or more reasons may be sent to the merchant and in response to the request for additional information.

DDS Pre-Authorization—Parallel Transaction Pre-Authorization Platform. Some aspects described herein may provide a method for allowing merchants to pre-authorize transactions, such as particularly high-value or high-risk transactions. In this manner, merchants may be provided, in advance, a degree of confidence that the transaction is valid. An indication of a financial transaction requested by a user may be received from a merchant device. Transaction metadata associated with the financial transaction may be received from the merchant device. A request for authorization of the financial transaction to a user device may be sent. Based on receiving, from the user device, a response to the request for authorization of the financial transaction, a computing direct data share system may determine whether to preauthorize the financial transaction by testing the transaction metadata based on one or more criteria. An indication of whether the financial transaction is preauthorized may be sent to the merchant device. In other words, before the transaction is actually conducted, the computing direct data share system may determine whether the transaction is preauthorized, such that the merchant may be informed whether to allow the transaction to continue. After sending the indication of whether the financial transaction is preauthorized, authorization information may be received from the payment processing service. The authorization information may correspond to the financial transaction. The authorization information may indicate processing, by a payment processing service (e.g., VISA, MasterCard), of payment information associated with the financial transaction. Based on determining that the financial transaction was preauthorized and based on the authorization information, an indication of whether the financial transaction is authorized may be sent.

User Exposure—Enhanced Feedback Exposure for Users Based on Transaction Metadata. Some aspects described herein may provide a method wherein a direct data share system may store and make available (e.g., to requesting computing devices) some aspects of past transaction metadata. In this way, users might be able to better recall past transactions, validate past transactions (and avoid improperly issuing chargebacks against legitimate transactions), and the like. Transaction metadata comprising one or more data elements corresponding to one or more attributes of a financial transaction, wherein the transaction metadata is associated with a concurrent transmission of payment information, for the financial transaction, to a payment processing service may be received via a first interface and from a merchant. The transaction metadata may be tested based on one or more criteria. A direct data share system may determine whether to authorize the financial transaction based on the tested transaction metadata and based on authorization information that indicates processing of the payment information by the payment processing service. The authorization information may correspond to the financial transaction. After determining whether to authorize the financial transaction, a request for transaction information associated with the financial transaction may be received from a user device. For example, this request may be part of a user using the user device to browse a website comprising a listing of past transactions. A transaction summary may be generated in response to the request for the transaction information and based on the transaction metadata. The transaction summary may be sent to the user device and/or other sources, such as a computing device associated with a call center.

Dispute and Fraud Claim Resolution—Storage and Processing of Transaction Metadata for Dispute and Fraud Claim Resolution. Some aspects described herein may provide a computer-implemented method for transaction dispute and fraud claim resolution. Given the added value of transaction metadata (as described further herein), the transaction metadata may be of particular use when determining whether a transaction was legitimate or fraudulent. This is particularly the case where additional transaction metadata might not be used during an initial authorization process, but may be stored and used should a dispute and/or fraud claim ever arise. As will be described further herein, a direct data share system may receive transaction metadata comprising one or more data elements corresponding to one or more attributes of a financial transaction. That transaction metadata may be associated with a concurrent transmission of payment information, for the financial transaction, to a payment processing service (e.g., VISA, MasterCard). That transaction metadata may be received via a first interface and from a merchant device. A first portion of the transaction metadata based on one or more criteria may be tested. The direct data share system may determine whether to authorize the financial transaction based on the tested transaction metadata and based on authorization information, corresponding to the financial transaction, that indicates processing of the payment information by the payment processing service. An indication of a dispute and/or fraud claim associated with the financial transaction from a computing system may be received. In response to receiving the indication of the dispute and/or fraud claim associated with the financial transaction from the computing system, a second portion of the transaction metadata may be tested. That second portion of the transaction metadata may be, for example, previously-unprocessed portions of the transaction metadata that, when processed, indicate a legitimacy of the financial transaction. The tested second portion of the transaction met may be sent to the computing system.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 11 depicts an example of payment information and transaction metadata.

DETAILED DESCRIPTION

Figure 1:
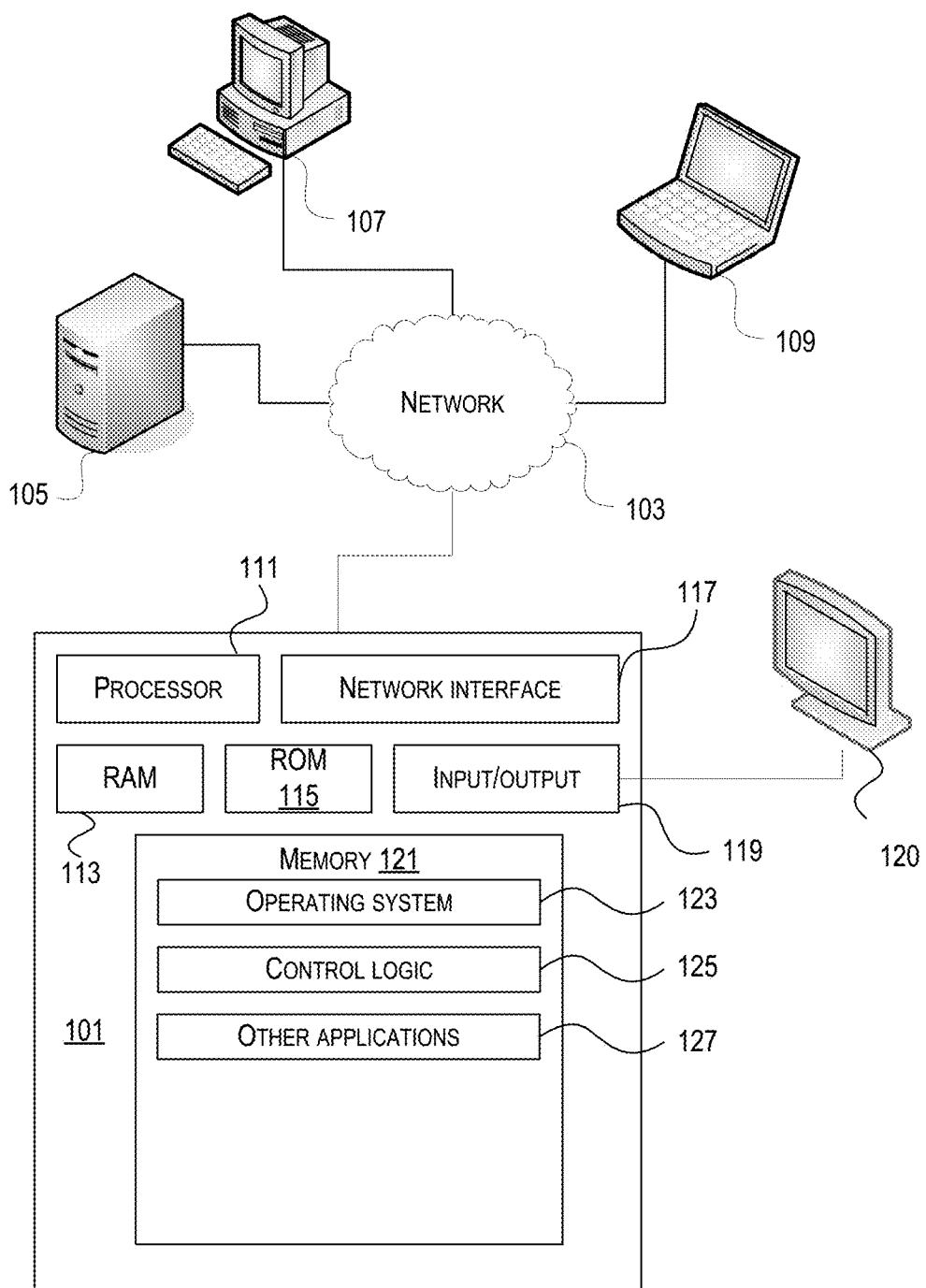
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for directly sharing data related to transactions so as to augment the authorization processing of such transactions. This process augments conventional payment processing systems to consider additional transaction metadata data in parallel to the information processed by conventional payment processing networks. In addition to enabling a computing system to consider additional transaction data when authorizing a transaction, this system has numerous other technical benefits, such as being able to dynamically configure itself in view of the speed of conventional payment processing systems.

Conventional payment processing systems are limited in a variety of ways. For example, for consistency and legacy reasons, conventional payment processing systems generally use a limited set of data to make authorization decisions. Though it might be valuable to consider more data when determining whether to authorize a transaction, doing so would significantly complicate and slow down conventional payment processing systems. This can be extremely undesirable: since such systems often handle thousands, if not millions, of transactions per day, added complexity and delay can cause significant issues. Moreover, in some instances, applicable service agreements may require that transactions be processed in a sufficiently speedy manner. As will be described in significant detail later, the features described herein remedy these and other issues by augmenting conventional payment processing systems and performing certain processing steps (e.g., processing of additional data, referred to herein as transaction metadata) separate from, and parallel to, conventional payment processing systems. Such an augmentation may be configured to add to the overall accuracy and robustness of authorization decisions without impeding the speed and/or implicating the legacy devices of conventional payment processing systems. In other words, the system described herein preserves the many advantages of processing additional transaction metadata, while mitigating the drawbacks of such additional data. Moreover, this parallel processing may be configured in certain manners to ensure that the speed of the processing is roughly approximate to the speed of conventional payment processing, such that no additional delay is introduced during processing. Moreover, addition of such transaction metadata to authorization decisioning processes enables merchants to learn more about why certain transactions may have been declined, may provide consumers more detail as to past transactions, and may allow the system to better address and resolve past transaction fraud claims.

As one example of an advantage of the particular structure of improvements described herein, by processing transaction metadata in a manner parallel to conventional payment processing systems, those payment processing systems need not be modified. This is, itself, a significant cost savings. For example, rather than forcing multitudinous merchants to retrofit existing point-of-sale systems, such point-of-sale systems can operate in conjunction with new technologies. As another example, rather than running the cost and security risks of reconfiguring legacy point-of-sale systems, the present system can operate in parallel and not inadvertently risk system delays, shutdowns, or unexpected behavior.

As such, the disclosures herein improve the functioning of computers by improving the manner in which computers handle high-speed, high-complexity, and often high-value transactions. Modern financial transactions rely on an extensive network of computing devices to process those transactions. For example, various interconnected computing devices of a payment processing service (e.g., VISA, MasterCard) may be configured to detect transaction validity (e.g., detect fraud), perform the electronic transmission of funds, and the like. In such circumstances, even microseconds worth of delay can be undesirable: after all, given that payment processing systems can process thousands (if not millions) of transactions a minute, microseconds worth of delay can slow financial transactions significantly. Moreover, given the variety and complexity of such transactions, such computing devices are often being reconfigured and reevaluated to improve their ability to detect and prevent fraud. As such, administrators are often tasked with making a trade-off between fraud detection and processing speed. Those issues are fundamentally rooted in the field of computing devices, and improvements to those computing devices (e.g., the manner in which they transmit data, process data, or the like) can have significant implications for how the financial transactions are handled. These improvements are computer-oriented in that they relate to the unique configuration of computing devices and networks required for modern transaction processing in view of, for example, preexisting payment processing systems. Indeed, as described further herein, some of the improvements described herein are directed to transaction processing in view of the time it takes for other computing devices (e.g., of preexisting payment processing systems) to process other aspects of a transaction. Moreover, as described further herein, some of the improvements described herein relate to reconfiguring the order in which computing devices process data associated with transactions in order to improve the security and speed of those transactions.

Before discussing these concepts in greater detail, however, several examples of a computing device that may be used in implementing and/or otherwise providing various aspects of the disclosure will first be discussed with respect to FIG. 1.

Devices and System Architecture

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, and other applications 127. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various system architectures which may be used for transaction processing.

Figure 2:
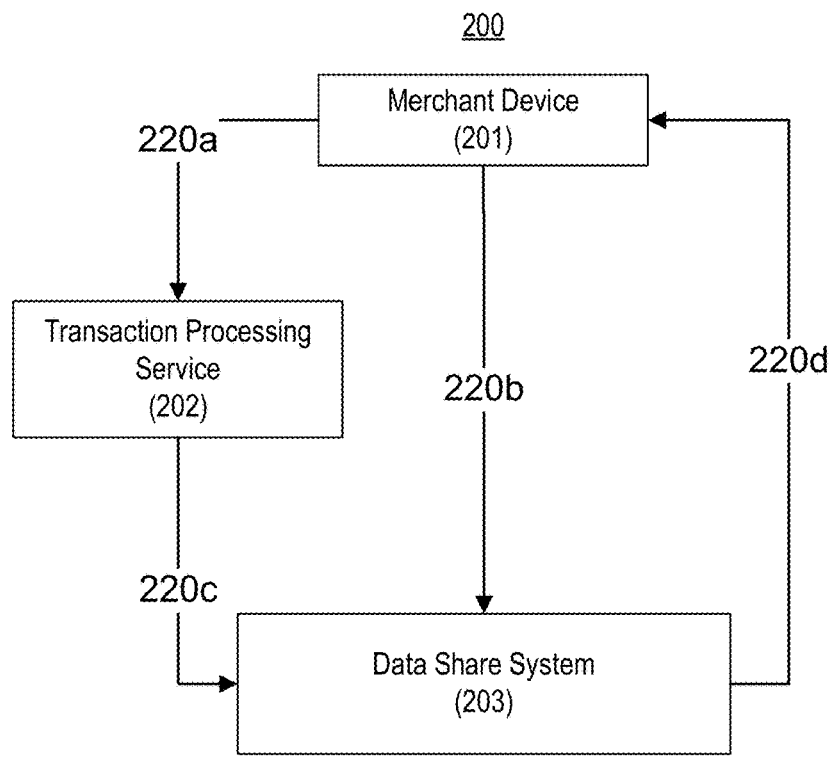
FIG. 2 depicts an example transaction authorization architecture according to one or more aspects of the disclosure.

FIG. 2 is a simplified example of a network which may process transaction metadata in parallel to conventional payment processing. Particularly, FIG. 2 depicts a computer network 200 where a merchant device 201 sends transaction information for authorization to a transaction processing service 202 (e.g., a service provided by VISA and/or MasterCard) and a data share system 203. Any of the devices shown in FIG. 2 (e.g., the merchant device 201, the transaction processing service 202, and/or the data share system 203) may be all or portions of computing devices, such as those discussed with respect to FIG. 1. For instance, the merchant device 201 may be a point-of-sale device in a store, whereas the transaction processing service 202 may be a series of remotely-located computing devices which collectively execute to process credit card transactions.

In transmission 220a, the merchant device 201 (e.g., a point-of-sale system, a merchant website, or similar computing device) may send payment information (e.g., a credit card number, a personal identification number, and basic transaction details) to the transaction processing service 202. The sending of the payment information may be in accordance with a preexisting standard, such that modification of the payment information might not be practicable. Indeed, this process may be part of a conventional payment processing system, such that the nature of the transmissions may be based on the nature of the transaction processing service 202. For example, credit card transactions for a first payment card network may be different than credit card transactions for another payment card network. As another example, transmissions as part of transmission 220a for online payments may be different than those for in-person payments. As will be detailed further below, one advantage of the system described herein is that this process need not be modified in order to perform the steps described herein.

Around the same time, in transmission 220b, the merchant device 201 may send, to the data share system 203, transaction metadata. This transaction metadata may be information about a transaction above and beyond the payment information sent in transmission 220a. For example, the transaction metadata may comprise a listing of items involved in the transaction, the price of the items, GPS coordinates of the transaction, or the like. As will be described in further detail below, the data share system 203 may be configured to complete validation of the transaction metadata (e.g., perform preliminary steps to determine whether the transaction should be authorized) around the same time as a result is received from the transaction processing service 202. That said, more transaction metadata may be transmitted to the data share system 203 than is actually validated or otherwise processed by the data share system 203. For example, as will be described in further detail below, the data share system 203 may select which portion(s) of transaction metadata to process, and may store and/or discard other portions of the transaction metadata.

In transmission 220c, authorization information may be received from the payment network 202. This authorization information may be received at around the same time when validation of the transaction metadata is completed by the data share system 203. In other words, and as will be detailed below, it may be desirable to complete the validation of transaction metadata in advance of (or at roughly the same time as) receipt of the authorization information so as to avoid adding delays to the process of authorizing a transaction.

Then, in transmission 220d, and based on the validated transaction metadata and the received authorization information, an indication of whether the transaction is authorized may be transmitted from the data share system 203 to the merchant device 201. In other words, based on both the authorization information and the transaction metadata, a decision as to whether to authorize a transaction may be made. This may be a significant improvement over conventional payment processing systems, which often rely on the authorization information alone to make such determinations.

Figure 3:
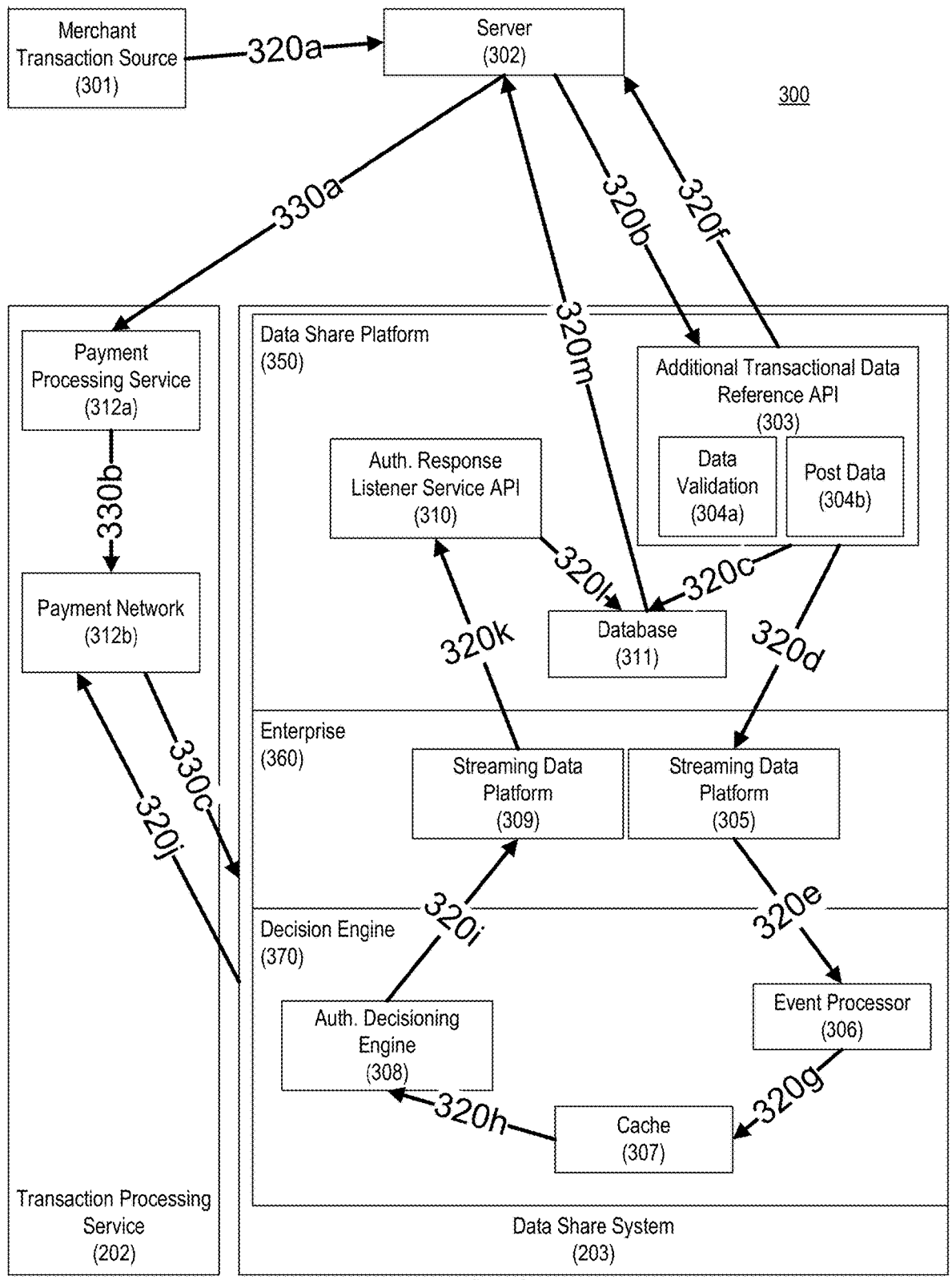
FIG. 3 depicts a more detailed example transaction authorization architecture according to one or more aspects of the disclosure.

Discussion will now turn to a more detailed analysis of this system, including various aspects of the device(s) which may be used to implement this system. FIG. 3 depicts a particular implementation of various devices which, like FIG. 2, depict the augmentation of a conventional payment processing system with a system which processes additional transaction metadata. As such, FIG. 3 depicts a computer network 300 including the data share system 203 that is similar to, but much more detailed than, the system depicted in FIG. 2. Particularly, FIG. 3 depicts a circumstance where a transaction is requested by a merchant transaction source 301 (e.g., a point-of-sale system, a merchant website, an online banking account, or the like) and sent to a merchant server 302. The various boxes depicted in FIG. 3 may be all or portions of computing devices, such as any of those shown in FIG. 1. For example, the merchant transaction source 301 and the server 302 may be the same computing device (e.g., such that the merchant transaction source 301 may be an online banking account managed by a bank, and the server 302 may be a payment system operated by the same bank) and/or may be different computing devices (e.g., the merchant transaction source 301 may be a point-of-sale device in a store, and the server 302 might be a server configured to receive information from one or more pointof-sale systems). For the purposes of illustration, the data share system 203 shown in FIG. 3 is broken into a data share platform 350, an enterprise level 360, or a decision engine 370. In this way, as will be detailed more below, the various elements may be divided in that the data share platform 350 devices and transmissions may relate to how data is collected and transmitted, the enterprise level 360 devices and transmissions may relate to how such data is ingested and queued for processing, and the decision engine 370 devices and transmissions may relate to how decisions are made based on such data. An additional transaction data reference API 303, an authorization response listener service API 310, and a database 311 may be part of a data share platform 350. A streaming data platform 309 and a streaming data platform 305 may be part of an enterprise level 360. An authorization decisioning engine 308, an event processor 306, and a cache 307 may be part of a decision engine 370. More broadly, the data share platform 350, the enterprise level 360, and the decision engine 370 collectively may be the same or similar to the data share system 203.

The arrows depicted in FIG. 3 need not suggest a particular formatting for the transmission of data. Transmissions between any of the devices depicted in FIG. 3 may be performed over one or more networks, such as the network 103, and/or via suitable hardware or software. In particular, transmissions 330a, 330b, and/or 330c may be transmitted via an entirely different network as compared to the other transmissions. Indeed, the network via which the transmissions 330a, 330b, and/or 330c is transmitted may correspond to a legacy network maintained by a payment card network (e.g., VISA, MasterCard), whereas the other transmissions may be conducted via, for example, the Internet. As such, the transmissions between the server 302 and the transaction processing service 202 (which includes payment processing service 312a and payment network 312b) and the server 302 and the database 311 and/or the additional transaction data reference API 303 may be performed on entirely different networks. In this manner, transmissions associated with conventional payment processing (e.g., those involving the transaction processing service 202, including the payment processing service 312a and/or the payment network 312b) may involve an existing network (e.g., a legacy network, such as may manage the transmission 330a), whereas those involving the server 302 and other devices may be using separate networks, including separate protocols. In this manner, the data share platform 350 and the devices part of the data share platform may augment, rather than replace or otherwise interfere with, the devices of the payment processing service 312 and the payment network 312b. Moreover, if two or more of the devices depicted in FIG. 3 are virtualized (e.g., software executing on a server) and/or comprise the same computing devices, the elements may transmit data via software and/or hardware, such as transmitting data via a messaging system of an operating system.

The transaction processing service 202, which includes the payment processing service 312a and the payment network 312b, may vary based on the nature of the payment processing. For example, the transaction processing service 202 may comprise an online payment processing service, such as the one offered by Stripe, Inc. of San Francisco, Calif. In this manner, the transaction processing service 202 may comprise a wide variety of steps and intermediary devices. As will be detailed further below, the transaction processing service 202 may be conventional and, in some respects, a black box in that it might not be readily changed.

As a preliminary introduction to devices and transmissions discussed in more detail below, the merchant transaction source 301 and the server 302 may be configured to receive information about a transaction. Such a transaction may be, for example, a user using a credit card with the merchant transaction source 301 (e.g., a point-of-sale system) to initiate payment for goods, such that the server 302 may receive information such as the cost of the goods, the identity of the goods, information identifying the credit card, and the like. Conventionally, such devices would simply transmit (e.g., in transmission 330a) very preliminary sets of information (e.g., a credit card number and payment amount) to the payment processing service 312a and await an indication as to whether the transaction is valid. That said, as depicted in both FIGS. 2 and 3, the present disclosure augments such processing and provides by providing transaction metadata processing in parallel. More particularly, additional information (referred to herein as transaction metadata, and which may include information such as the particular identity of goods or services to be purchased, GPS coordinates of a customer, or the like) is collected and processed in parallel to conventional processing steps, thereby allowing for more fine-grained transaction processing without altering or otherwise slowing down conventional payment processing. Thus, as will be explored in greater detail below, FIG. 3 shows two separate pathways for different sets of transaction data, which may be on different networks: a conventional payment processing pathway via the payment processing service 312a and via a first network, and a more robust transaction metadata processing pathway which begins with the devices and transmissions depicted as part of the data share platform 350.

The merchant transaction source 301 may be any form in which payment information may be stored, received, or otherwise used. The merchant transaction source 301 may be a point-of-sale terminal located in a store or restaurant, a website (e.g., an online store), or the like. The merchant transaction source 301 may comprise a single or multiple devices, such as a series of computing devices configured to receive and transmit banking information from a user.

The merchant transaction source 301 may be associated with one or more transactions. A transaction may be a purchase of one or more goods or services. For example, a transaction may be a purchase of goods from an online store, a purchase of food at a grocery store using a point-of-sale system in that grocery store, payment for car repair using a point-of-sale system of a repair shop, or the like. The merchant transaction source 301 may perform one or more steps before or after such a transaction is completed. For example, the merchant transaction source 301 may be a point-of-sale system used to purchase goods, but the goods might not be delivered until a later date. As will be described in further detail below, a transaction may be associated with a particular time of day, a particular location (e.g., a store, a website, a country), a number of goods and/or services, different individuals (e.g., a store clerk, a customer), or the like. For example, a transaction for purchase of three grocery items might be initiated at a physical store at 9:00 PM EST. As another example, a transaction for purchase of an online service might be initiated on a website in the evening.

In transmission 320a, data from the merchant transaction source 301 may be sent to the server 302. The server 302 may be any device configured to receive information about the merchant transaction source 301. For example, the server 302 may be a merchant server configured to allow users to make purchases on an online store, and/or may be a server configured to process credit card transactions from one or more physical stores. The server 302 may be managed by a payment network, such as the payment network 312b and/or the payment processing service 312a. As such, the merchant transaction source 301 may be managed by a merchant, but the server 302 might be managed by a third party, such as a payment network.

The server 302 may be configured to collect, store, and/or transmit transaction metadata about one or more transactions. For example, the server may store transaction metadata about one or more goods or services associated with a transaction, a time of the transaction, a location of the transaction (e.g., a particular store, particular GPS coordinates, a particular website or Uniform Resource Locator (URL) used to perform the transaction), an identity of one or more individuals involved in the transaction, or the like. Such transaction metadata may be collected from a wide variety of sources. For example, the server 302 may be configured to use a global positioning device in a smartphone to collect GPS coordinates for a transaction conducted using the smartphone, and/or may be configured to query a user database to determine an identity of a user of the merchant transaction source 301. The transaction metadata may comprise virtually any information associated with a transaction, and thus need not be limited to the particulars of the merchant transaction source 301. The transaction metadata may be stored in a database, such as the database 311 and/or a database communicatively coupled to the server 302.

In transmission 330a, the server 302 may send payment information associated with the merchant transaction source 301 to the payment processing service 312a. This transmission, along with transmission 330b where the payment processing service 312a sends information to the payment network 312b, may be all or portions of a process wherein a customer pays for goods or services. The payment processing service 312a and the payment network 312b may both or individually be associated with organizations associated with the merchant transaction source 301, such as a credit card network. As a particular example, the payment processing service 312a and the payment network 312b may be both managed by a financial services company like Visa Inc., of Foster City, California, or MasterCard Incorporated of Purchase, N.Y. Such transmissions may be all or portions of a conventional authorization system for the merchant transaction source 301, such as a conventional credit card authorization process.

As indicated above, the authorization information and the transaction metadata need not be the same information, and in many circumstances the transaction metadata may provide additional, potentially more robust information about a transaction. For example, while the authorization information may comprise information required by the payment processing service (e.g., a credit card number, a credit card verification value (CVV)), the transaction metadata sent to the data share platform 350 may comprise a wide variety of details about the transaction, such as the items purchased by the transaction, a location of the transaction (e.g., a location of a smartphone used to make the transaction), an IP address of a device used in the transaction, the identity of goods or services purchased by the transaction, and the like. In other words, the transaction metadata may comprise more and/or different information as compared to the authorization information. The payment processing service 312a and the payment network 312b may be unknown, remote, and/or otherwise uncontrollable by parties involved with the server 302, the data share platform 350, the enterprise level 360, and/or the decision engine 370. In other words, such transmissions might not readily be changed, might be managed by another organization, and/or might be preexisting (e.g., legacy) systems that might not be capable of handling transaction metadata. In other words, while the authorization information might be a limited quantity of information set by a standard that cannot be changed, the transaction metadata may comprise a much wider variety of information for use in determining whether to authorize a transaction. As such, as will be described in greater detail below, the data share platform 350, the enterprise level 360, and/or the decision engine 370 may be configured to effectuate authorization of transactions in view of the fact that the payment processing service 312a and the payment network 312b might not be able to use transaction metadata, but might provide some information (e.g., authorization information) useful for authorization of a transaction.

In transmission 320b, the server may send transaction metadata to the additional transactional data reference API 303, which entails the data validation 304a and post data 304b elements. The transmission of this data in transmission 330b may be parallel to (e.g., roughly at the same time as) the transmission of the payment information in transmission 320a. The additional transactional data reference API 303 may perform data validation 304a in that it may validate all or portions of the transaction metadata for accuracy, reliability, and consistency. For example, the data validation 304a may comprise ensuring that GPS coordinates in the transaction metadata are a consistent format, and/or ensuring that all numerical values are in a consistent format. The data validation 304a may comprise testing the transaction metadata based on one or more criteria. For example, the criteria may require that the transaction metadata be complete, that it not have any obvious formatting errors, or the like. The post data 304b transmission may comprise one or more transmissions which collectively transmit the data, as discussed in more detail below.

In transmission 320c, the additional transactional data reference API 303 may send transaction metadata (that has been, e.g., validated via the data validation 304a) to the database 311. The database 311 may store the transaction metadata for future use. For example, as will be described in greater detail below, the transaction metadata may be stored such that parties to the transaction (e.g., merchants, customers, users, etc.) may later retrieve the information to confirm the validity of the transaction. As another example, the database 311 may store large quantities of transaction metadata along with decisions based on that transaction metadata, and that information may be used to train a machine learning model.

In transmission 320d, the additional transactional data reference API 303 may send the transaction metadata (e.g., as validated via the data validation 304a, if desired) to the streaming data platform 305. The streaming data platform 305, which may be the same or similar as the streaming data platform 309, may be configured to ingest and process data. Such a streaming data platform may be used to continuously ingest, process, store, and/or process such data. As such, the streaming data platform 305 and the streaming data platform 309 may be implemented in FIG. 3 to process the large volume and consistent flow of data which may be received from the additional transactional data reference API 303. That said, the streaming data platform 305 and/or the streaming data platform 309 may be omitted in some embodiments (such that, for example, the additional transactional data reference API 303 may send data directly to the event processor 306).

In transmission 320e, the streaming data platform may send the transaction metadata to the event processor 306. The event processor 306 may be configured to process transaction metadata to, for example, determine all or portions of the transaction metadata for processing. As will be described in more detail below, for speed and efficiency reasons, the event processor 306 (and/or other elements, such as the additional transactional data reference API 303) may select which portion(s) of transaction metadata should be used for subsequent processing. Such portions may be less than all of the transaction metadata. For example, portions of the transaction metadata may be selected based on those portions being speedily processed and/or readily probative of transaction validity.

In transmission 320g, the event processor 306 may send all or portions of the transaction metadata to the cache 307. The cache 307 may be used to manage processing by the authorization decisioning engine 308, as described further below. In this manner, the authorization decisioning engine 308 need not be overwhelmed by the speed in which transaction metadata is received from the event processor 306.

In transmission 320h, the cache may send all or portions of the transaction metadata to the authorization decisioning engine 308. The cache 307 may send such transaction metadata periodically, based on a processing status of the authorization decisioning engine 308, or the like.

The authorization decisioning engine 308 may make a determination as to whether to authorize a transaction. Such a decision may be based on all or portions of the transaction metadata received from the cache 307, and/or may be based on authorization information received from the payment network 312b in transmission 330c. In other words, based on the conventional information about authorization (e.g., as provided by the payment network 312b) as well as additional processing of transaction metadata (e.g., information in addition to that processed by the payment network 312), the authorization decisioning engine 308 may determine whether to authorize a transaction. In this way, the system may be configured to consider a wide variety of data elements in determining whether to authorize a transaction. In particular, and as will be described in further detail below, the authorization decisioning engine 308 may make a determination as to whether to authorize a transaction based on authorization information (e.g., conventional indications of authorization as received from a typical payment processing network, such as VISA or MasterCard) in addition to transaction metadata (e.g., additional information, above and beyond that used for the authorization information and received via an entirely different interface, used to help determine the validity of the transaction).

The authorization decisioning engine 308 may process transaction data in a manner that uses a machine learning model. A machine learning model may be trained, using data comprising transactions tagged based on whether they should be authorized, to assign, based on input transaction metadata, an authorization value to transactions. Such data might be stored in a database, such as the database 311. Processing the transaction metadata may comprise determining, based on the authorization information and the correlated transaction metadata and using the machine learning model, whether the financial transaction should be authorized. In this manner, the machine learning model may learn, over time, aspects of transaction metadata that may indicate, for example, validity or fraud. Though referred to as a single machine learning model, multiple machine learning models might be implemented to aid the processes determined herein. For example, one machine learning model might be trained to predict validity based on the geographic location of a transaction, whereas another machine learning model might be trained to predict validity based on the items involved in a transaction.

In transmission 320j, the same or a similar indication of whether or not the transaction is authorized may also be sent to the payment network 312b. For example, the indication sent to the streaming data platform 309 may comprise an indication of why the transaction metadata indicates a legitimate transaction (e.g., one or more reasons the transaction was approved), whereas the indication sent to the payment network 312b may comprise a Boolean indication of whether the transaction should be allowed.

In transmission 320i, the authorization decisioning engine 308 may send an indication of whether or not the transaction is authorized to the streaming data platform 309. This indication need not be in any particular format, and may depend on the nature of the server 302, among other considerations.

In transmission 320k, the streaming data platform 309 may send the indication of whether or not the transaction is authorized to the authorization response listener service API 310. The authorization response listener service API 310 may receive the indication of whether or not the transaction is authorized and, if desired, process or otherwise format it. The authorization response listener service API 310 may be configured to transmit the indication directly to the server 302 if desired (e.g., so as to avoid potential delays associated with the database 311).

In transmission 320l, the authorization response listener service API 310 may send the indication of whether or not the transaction is authorized to the database 311. In this manner, the database 311 may store transaction metadata as well as indications of whether or not transactions have been authorized. The database 311 may additionally and/or alternatively correlate such information, such that transaction metadata may be compared with decisions made by the authorization decisioning engine 308. As will be described further below, this may advantageously allow the database 311 to store data in a manner which might be used to train machine learning models.

In transmission 320m, the database 311 and/or the authorization response listener service API 310 may send the indication of whether or not the transaction is authorized to the server 302. In this manner, the server 302 (which may, e.g., be associated with a merchant) may learn whether the transaction has been authorized. Additionally and/or alternatively, an indication of whether the transaction has been authorized may be received from the payment processing service 312a. As such, the server 302 might receive two indications: one reflective of decision-making by the authorization decisioning engine 308, and one made by the payment processing service 312a and/or the payment network 312b.

Direct Data Share

Figure 4:
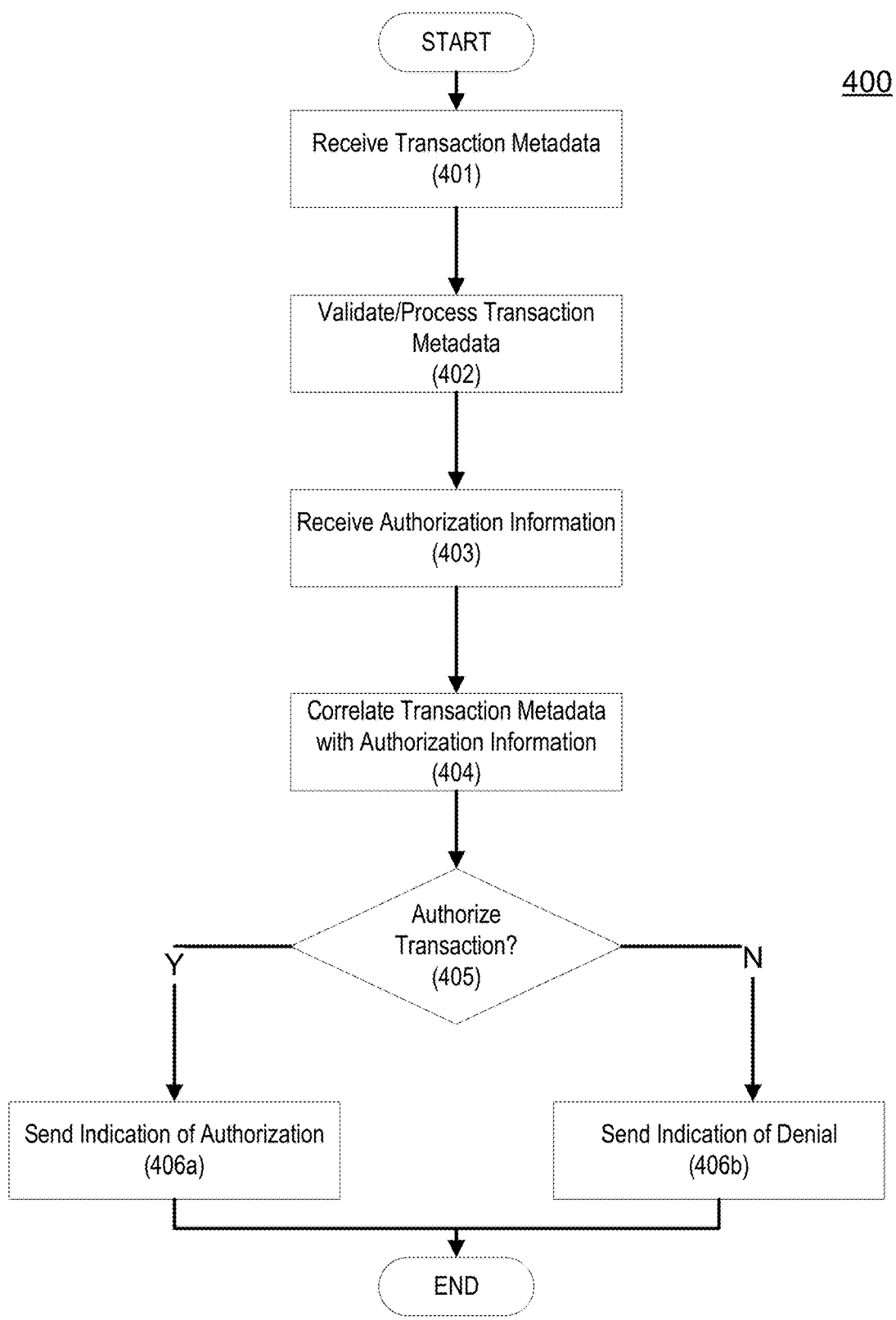
FIG. 4 depicts a flowchart comprising steps detailing the transmission and use of transaction metadata.

Discussion will now turn to an example of how transaction metadata associated with a transaction may be processed as part of determining whether to authorize that transaction. Such steps may be performed by one or more computing devices, such as the elements discussed as part of the data share platform 350, enterprise level 360, and/or decision engine 370 of FIG. 3. As such, FIG. 4 depicts a flowchart 400, and the steps of that flowchart 400 which may be all or portions of an algorithm. A computing device may comprise one or more processors and memory storing instructions that, when executed by the one or more processors, cause the performance of all or portions of the steps of FIG. 4.

In step 401, transaction metadata may be received by, e.g., the data share platform 350. The transaction metadata may be received from a merchant and via a first interface, such as a transaction metadata pathway (e.g., the additional transactional data reference API 303) separate from other pathways (e.g., pathways used to perform conventional payment processing steps). As described with respect to FIG. 3 above, the transaction metadata may be received from a merchant (e.g., via the server 302, and based on a transaction initiated using the merchant transaction source 301). The transaction metadata may comprise one or more data elements corresponding to one or more attributes of a financial transaction. For example, one element may correspond to a total price of the financial transaction, and one element may comprise a list of goods purchased by the financial transaction. The transaction metadata may be associated with a concurrent transmission of payment information, for the financial transaction, to a payment processing service 312a (e.g., via transmission 330a). The first interface, which may also be referred to as a transaction metadata pathway, can be a communication pathway over the Internet or a similar network, and may be the same or similar as the pathway used for transmission 320b of FIG. 3. In other words, as already indicated above, the first interface may effectuate receipt of the transaction metadata and may be entirely different than the pathway(s) used for transmission of payment information and/or receipt of authorization information from a payment processing service.

In step 402, the transaction metadata may be validated (by, e.g., the data share platform 350) based on one or more criteria. The one or more criteria may be any criteria for, e.g., ensuring the validity, consistency, and/or formatting of the transaction metadata. For example, validating the transaction metadata may comprise removing unnecessary content (e.g., double spaces) from the transaction metadata, ensuring that all numbers in the transaction metadata are the same format, testing portions of the transaction metadata for consistency, or the like. Validating the transaction metadata may additionally and/or alternatively comprise confirming a validity of the transaction metadata. For example, the transaction metadata may comprise authorization credentials for a merchant which may be used to ensure that the transaction metadata was received from the merchant. Validating the transaction metadata may comprise validating a transaction data element of the transition metadata. The transaction data element may uniquely identify a financial transaction. For example, the transaction data element may be an arbitrary string generated to uniquely identify the transaction amongst millions of transactions occurring around the same time or with respect to the same merchant. The transaction data element may additionally and/or alternatively be, for example, a timestamp of the transaction, a user identifier of the transaction, one or more portions of a credit card number, an identifier of a good or service involved in the transaction, or the like. Such transaction data elements may uniquely identify a transaction individually and/or in combination: for example, the identity of a merchant and the time of a transaction associated with the merchant may be sufficient to uniquely identify a transaction, particularly in circumstances where the merchant does not process many transactions. Such validation may be, for example, performed by the additional transactional data reference API 303 and in the data validation 304a step. More broadly, step 402 may comprise the transmissions 320d-320h of FIG. 3, and may relate to the concepts discussed regarding elements 304a, 305, 306, 307, and/or 308 of FIG. 3.

Validating the transaction metadata may comprise selecting a portion of the one or more data elements to test using the one or more criteria. As discussed further herein with respect to FIGS. 5 and 6, recognizing that not all portions of the transaction metadata may be able to be processed in a sufficiently short amount of time (e.g., quick enough to meet or beat the processing performed by the payment processing service 312a and/or the payment network 312b), it may be desirable to select only a portion of the transaction metadata for processing. The portion of the one or more data elements selected for testing may be selected based on how strongly it is probative of the validity of a transaction, how easy and/or quick it is to process, how related it is to the validity of a transaction, or the like.

Figure 5:
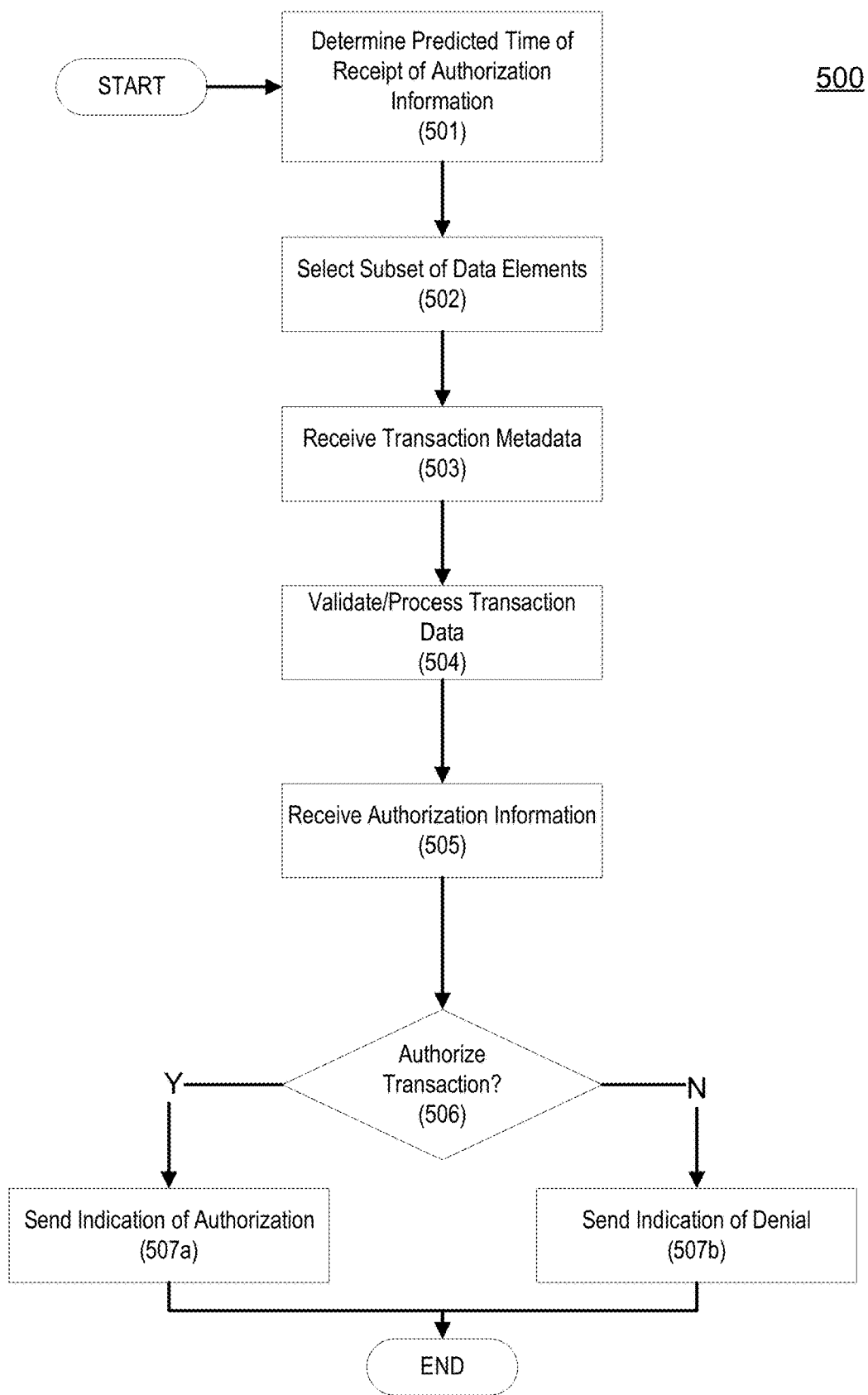
FIG. 5 depicts a flowchart comprising steps detailing dynamically adjusting validation steps in view of processing speed requirements.
Figure 6:
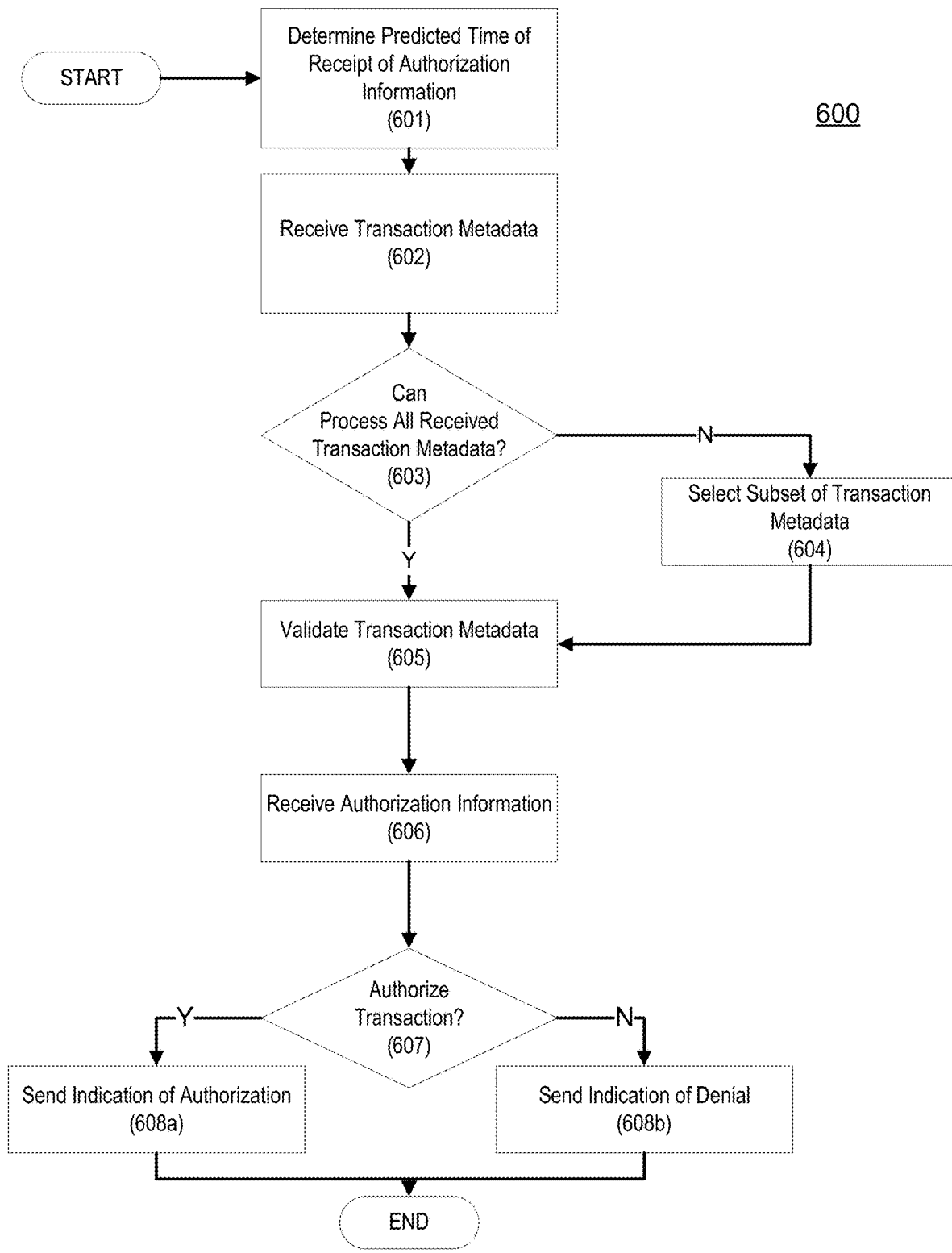
FIG. 6 depicts a flowchart comprising steps detailing dynamically adjusting validation steps in view of an estimated time of receipt of transaction authorization information.

As discussed in more detail herein with respect to FIGS. 5 and 6, the one or more criteria may be determined such that a predicted transaction validation time (e.g., an average transaction validation time over a period) is less than a predicted time of receipt of the authorization information. The criteria used to test the transaction metadata may be limited such that validation of the transaction metadata is likely to be complete before the authorization information is received (e.g., in transmission 330c of FIG. 3). As such, the validation processes described herein need not slow down the overall speed of transaction processing. A predicted time period may be associated with one or more of: receipt of transaction metadata, and validation of transaction metadata may be determined. Such a predicted time period might correspond to, for example, transmission 320a through one or more transmissions (e.g., transmission 320h) of FIG. 3. In this manner, the one or more criteria may be determined so that the transaction metadata is ingested (e.g., by the authorization decisioning engine 308) at the same time or before the authorization information is received. Based on that average time period, the one or more criteria may be adjusted. In this manner, the criteria might be adjusted such that the validation processes are predicted to be equal to or less than the average time period.

As part of step 402, the transaction metadata may be processed further to determine whether the transaction metadata supports authorizing a transaction. For example, if the transaction metadata contains an indication of a geographic location, the geographic location may be compared to a database of geographic locations associated with fraud. As another example, if the transaction metadata contains an indication of an item purchased by a transaction, the system may determine whether the item is associated with fraud (e.g., is a gift card or other item which might be used to launder funds). As another example, the transaction may be associated with a time period and/or a location, and determining whether to authorize the financial transaction may be based on the time period and/or the location. This is because, for example, a location (e.g., a website, a geographical location such as a particular store) might be associated with fraud. As yet another example, the transaction metadata may comprise an identification of a user associated with the financial transaction, and determining whether to authorize the financial transaction may be based on the identification of the user. For example, if the user is a particular member of a household, the financial transaction might be subject to relatively less scrutiny as compared to other members of the household. This might be particularly valuable where, for instance, a credit card is shared by a family and might be used by young children to make online purchases. As yet another example, the transaction metadata may comprise shipping information corresponding to the transaction, and determining whether to authorize the financial transaction is based on whether the shipping information corresponds to a user associated with the financial transaction. For example, if a credit card owned by a family in Nebraska is used to purchase goods for delivery in Russia, such use might indicate fraud. Such steps may vary widely based on an understanding of which aspects of transaction metadata may indicate a valid or potentially fraudulent transaction. As such, processing the transaction metadata in step 402 may additionally and/or alternatively comprise querying one or more databases for and receiving a set of criteria/rules for the transaction metadata, and/or may comprise querying one or more databases for information associated with a user. In turn, processing the transaction metadata may comprise comparing the transaction metadata to one or more data elements associated with the user of a payment method, such as the user's address, name, shopping habits, or the like.

As indicated by the discussion above, the transaction metadata may be processed in such a manner that considers one or more items to be purchased via the financial transaction. For instance, the system may consider an identity of the one or more items, a quantity of the one or more items, whether the one or more items comprise a gift card, a price associated with the one or more items, and/or whether the one or more items are regularly ordered by a customer associated with the payment information. For example, because gift cards are commonly used to effectuate fraud, the purchase of a gift card might be more probative of potential fraud. As another example, a large quantity of high-priced items might be probative of potential fraud.

The transaction metadata may be processed in such a manner that considers a history of financial transactions associated with the payment information. For example, if the payment information is used as part of high-dollar-value transactions, a sudden instance of a low-dollar-value transaction might be potentially fraudulent. As another example, if payment information is typically used during weekdays but never during a weekend, then use of the payment information during the weekend may indicate potential fraud. The history may be stored by one or more databases, such as the database 311. For example, the history may be based on transaction metadata stored in a database from previous transactions.

In step 403, authorization information may be received from the payment processing service 312a and/or the payment network 312b and by, e.g., the authorization decisioning engine 308. The authorization information may correspond to the financial transaction. The authorization information may indicate processing of the payment information by a payment processing service, such as the payment processing service 312a. As such, this step may be the same or similar as transmission 330c of FIG. 3. The authorization information might, in certain circumstances, be the type of information received by legacy systems to approve a financial transaction. For example, the authorization information may indicate, for example, whether a payment processing service (e.g., the payment processing service 312a and/or the payment network 312b) has authorized payment information (e.g., credit card numbers) presented via the merchant transaction source 301. The authorization information may be received after the transaction metadata is validated. Indeed, it may be desirable for the transaction metadata to be validated (and, e.g., received by the authorization decisioning engine 308) before the authorization information is received, such that processing of the transaction metadata does not slow down the authorization process of the transaction. The authorization information may indicate whether the payment information was approved by the payment processing service. The payment processing service may be, for example, one or more devices as part of a credit card network. The authorization information may be received via a different pathway as compared to the transaction metadata. For example, while the transaction metadata might be received via a first interface (e.g., as shown in transmission 320b of FIG. 3), the authorization information may be received via a second interface (e.g., as shown in transmission 330c of FIG. 3).

Though step 403 is shown as occurring after step 402 and before step 404, step 403 may occur any time before, during, or after any of steps 401 and/or 402. Because the payment information is processed in parallel to the transaction metadata (as described in FIGS. 2 and 3), it is possible that the authorization information may be received sometime during the process of FIG. 4. That said, it may be desirable for the authorization information to be received some time before the completion of step 402, as otherwise the system may be forced to wait for the authorization information to perform additional steps.

Authorization information need not necessarily indicate whether a transaction should be rejected. Rather, such information may merely indicate various checks made by a payment processing service. For example, the authorization information might comprise risk model information, geographical information, whether or not certain credentials (e.g., a credit card number) has been checked, or the like. The authorization information may comprise information detailed by ISO 8583.

In step 404, the validated transaction metadata may be correlated with the authorization information. This step may be performed by a variety of computing devices, such as any portion(s) of the decision engine 370. Correlating the validated transaction metadata with the authorization information may be based on the transaction data element validated in step 402. For example, correlating the validated transaction metadata with the authorization information may comprise determining that both pertain to a transaction that occurred at around the same time and involve the same merchant and/or customer. Recognizing transmission differences, potential delay, and/or the potential for small but inconsequential inaccuracies, correlating the validated transaction metadata with the authorization information need not comprise finding an exact match. For example, the validated transaction metadata may correspond to a time hundreds of milliseconds after the authorization information, and yet both may pertain to the same transaction. As another example, the validated transaction metadata may correspond to the authorization information within an acceptable margin of error.

Correlation may be performed using unique identifiers of a transaction. For example, a transaction may be assigned a unique alphanumeric identifier. That unique alphanumeric identifier may be assigned to both the payment information transmitted to a payment processing service as well as the transaction metadata. In turn, correlating the authorization information and the transaction metadata may comprise confirming that the authorization information and the transaction metadata share the same alphanumeric identifier.

In step 405, it may be determined whether to authorize the financial transaction based on the authorization information and the correlated transaction metadata. Such a decision may be made by, for example, the authorization decisioning engine 308. In other words, the two sets of data may be used to determine whether the financial transaction should be authorized. Such a decision may be based on one or more criteria. For example, if either or both of the authorization information or the correlated transaction metadata indicate potential fraud, then transaction may be rejected. If the determination is to authorize the financial transaction, the flowchart may proceed to step 406*a*. Otherwise, the flowchart may proceed to step 406*b*.

Broadly, the decision regarding whether to authorize the financial transaction may be based on both the authorization information and the validated transaction metadata indicating that the financial transaction should be authorized. In other words, if either set of data indicates that the transaction should not be authorized, then the decision in step 405 might be negative (though, in some circumstances, one set of data might overrule the other). With that said, such a Boolean result might not exist in all circumstances: for example, both the authorization information and the validated/processed transaction metadata may comprise a degree of confidence as to the veracity of a transaction, such as the decision in step 405 may be based on comparing the degrees of confidence to one or more thresholds.

In step 406*a*, based on determining to authorize the financial transaction, an indication that the financial transaction has been authorized may be transmitted back to the merchant or other source from which the transaction metadata was received. Such a step may be performed by, e.g., one or more of the devices of the data share platform 350. Alternatively, in step 406*b*, based on determining to deny the financial transaction, an indication that the financial transaction has not been authorized may be transmitted back to the merchant or other source from which the transaction metadata was received. In either case, the indication may additionally and/or alternatively be sent to the payment processing service and via the second interface such that, for example, both the merchant and the payment processing service are informed that the transaction was denied. The indication need not be in any particular format or transmitted in any particular way. For example, the indication might be a Boolean value (e.g., indicating whether the transaction should be authorized), a numerical value (e.g., indicating a confidence that the transaction is legitimate), or the like.

Dynamic Transaction Validation Adjustment in Advance.

Discussion will now turn to ways in which the above system may be configured in view of satisfying speed requirements for conventional payment processing systems. In particular, as will be detailed below, one advantage of the present system (and, in particular, the way in which it augments, in parallel, conventional payment processing) is that it may be dynamically adjusted such that it is no slower than such conventional payment processing.

As a preliminary introduction to FIG. 5, transaction metadata received from one or more merchants may be so voluminous so as to render processing all of the transaction metadata take quite a long time. In such a circumstance, processing all transaction metadata might undesirably delay transaction processing. In general, it can be desirable to ensure that the processing of transaction metadata takes approximately no longer than the average time of receipt of authorization information. In this manner, the transaction is, in effect, no slower than it would be without the processing of transaction metadata. This is a significant advantage to the augmentation of conventional payment processing systems as shown in FIGS. 2 and 3: by processing transaction metadata in parallel (rather than entirely replacing traditional/conventional payment processing), the nature of the parallel processing of transaction metadata can be varied such that it does not slow down the speed of conventional payment processing. As will be described with respect to FIG. 5, one way to ensure that the processing of transaction metadata takes no longer than the receipt and use of authorization information is to select, in advance, which elements of transaction metadata are to be processed. In this manner, even if large volumes of transaction metadata are already received, only certain pre-selected elements will be processed.

FIG. 5 shows a flowchart 500 showing steps for dynamic configuration of transaction metadata analysis, with a particular focus on pre-selecting portions of transaction metadata for subsequent validation. The flowchart 500 may be performed by one or more computing devices, such as those depicted in FIG. 3. The steps shown in FIG. 5 may be all or portions of an algorithm. A computing device may comprise one or more processors and memory storing instructions that, when executed by the one or more processors, cause the performance of all or portions of the steps of FIG. 5.

In step 501, a predicted time of receipt, from a payment processing service that processes payment information, of authorization information may be determined. Such a step may be performed by, e.g., one or more portions of the decision engine 370. The average time of receipt may correspond to a plurality of financial transactions such that, for example, the average time of receipt might be determined for a wide variety of financial transactions over a period of time. As the average time of receipt is a predicted, a precise value is not required, and a range of times may additionally and/or alternatively be used. The authorization information may indicate traditional/conventional processing, by the payment processing service (e.g., Visa, MasterCard), of the payment information for a corresponding financial transaction.

The average time of receipt may be based on a history of receipt of the authorization information over a period of time. In other words, the average time of receipt might be indicative of a time when authorization information is received by a device, such as in transmission 330*c* of FIG. 3. At least one of the plurality of financial transactions may be timestamped or may otherwise be associated with a particular time or time period. For instance, the average time of receipt might be calculated based on a group of transactions that occurred during a particular period of time (e.g., transactions received at night, on the weekend, or the like). This is because transaction processing might be performed at different speeds at different times, recognizing that the overall volume of transactions might be different at different times (e.g., more in-person transactions during the day, more online transactions in the evening). The average time of receipt might be calculated based on a group of transactions having a particular range of payment amounts. For example, the average time of receipt might correspond to transactions that are greater than one hundred dollars in value.

In step 502, a subset of one or more data elements of transaction metadata that is expected to be received for various transactions may be selected. Such a step may be performed by, e.g., one or more portions of the decision engine 370. In other words, the system may select aspects of not-yet-received transaction metadata for processing, in effect deciding in advance which elements of transaction metadata will be considered. Selecting the subset of the one or more data elements may comprise determining that validation of the subset of the one or more data elements has an expected processing time that is less than or equal to the average time of receipt of the authorization information. In this manner, the system may decide, in advance, which data elements of transaction metadata can be processed without delaying transaction processing. Absolute precision need not required in such a circumstance, and validation of the subset of the one or more data elements might have an expected processing time that, on average, is equal to or less than the average time of receipt of authorization information within a threshold.

Selecting the subset of the one or more data elements of the transaction metadata may comprise determining which data elements of transaction metadata are expected to be received. This may entail, for instance, determining which data elements of transaction metadata have been historically received. This may additionally and/or alternatively entail, for example, predicting what data elements of transaction metadata will be received from a particular merchant based on one or more device(s) (e.g., the merchant transaction source 301) used to conduct the transaction.

Selecting the subset of the one or more data elements may be performed by selecting a combination of the one or more data elements such that a sum of time periods corresponding to the subset is less than or equal to the average time of receipt of the authorization information. Selecting the subset of the one or more data elements may be based on a priority of at least one of the one or more data elements. For example, one data element might be more probative of validity than another, such that the former data element might be given a greater priority than the other. Selecting the subset of the one or more data elements may be based on a complexity of at least one of the one or more data elements. For example, if one data element requires significant amounts of time to validate and/or process, it might not be included.

Selecting the subset of the one or more data elements may be based on determining, for the selected subset, an estimated time of processing. In turn, selecting the subset of the one or more data elements may comprise determining, for the one or more data elements, a respective time period corresponding to validation. For example, a time-related data element might only take ten milliseconds to process, but a geography-related data element might take one hundred milliseconds to process. The system may calculate a time to process the selected subset by processing example data and measuring the time taken to completely process the example data. Additionally and/or alternatively, the system may individually process and time each element of the one or more data elements, and then determine a plurality of data elements that have time which, when summed, is less than or equal to the average time of receipt of authorization information determined in step 501.

Selecting the subset of the one or more data elements may be performed by receiving user input specifying one or more of the data elements. Such user input may comprise an indication of which data elements are considered of particular importance. For example, the Media Access Control (MAC) address of a device used to instantiate a transaction may be of relatively low value to an organization in determining the veracity of a transaction, such that it might be assigned a relatively low importance. In contrast, the geographical location of the same device might be of relatively significant value to an organization in determining the veracity of a transaction, as the location of the device might indicate whether it is being used by an authorized user or not. In such a circumstance, the user input might comprise an indication of which of the one or more data elements must be considered, such that those data elements must be included in the subset selected in step 502.

Selecting the subset of the one or more data elements may be performed on a periodic basis, such as the quantity and/or identity of the selected one or more data elements may change over time. In this manner, changes to the system (e.g., increases in processing power, added transaction volume, etc.) may be take into consideration when selecting which of the one or more data elements should be processed when transaction metadata is received. For example, the subset of the one or more data elements may be selected every week, such that changes to network speed, storage device speed, processor speed, or the like may be taken into account.

In step 503 transaction metadata may be received from a merchant. Such a step may be performed by, e.g., one or more portions of the data share platform 350. The transaction metadata may comprise the one or more data elements. The one or more data elements may correspond to one or more attributes of a new financial transaction. Each of the plurality of financial transactions may be associated with the merchant. This step may be the same or similar as step 401 of FIG. 4.

In step 504, the transaction metadata may be validated and/or processed based on the selected subset of the one or more data elements. Such a step may be performed by, e.g., one or more portions of the data share platform 350. Validating and/or processing the one or more of the plurality of data elements may comprise validating a transaction data element of the transaction metadata. For example, validating the transaction metadata may be based on a location associated with the new financial transaction. This step may be the same or similar as step 402 of FIG. 4.

Validating and/or processing the transaction metadata in step 504 may comprise discarding or storing, for later, portions of the transaction metadata that have not been selected. For example, if the subset of the one or more data elements selected in step 502 comprise only three data elements, but the transaction metadata comprises fifty data elements, then the remaining forty-seven data elements may be discarded or stored for later use. Indeed, as will be discussed with respect to FIGS. 9 and 10, storage may be advisable to allow merchants and/or customers to later retrieve and use transaction metadata.

In step 505, first authorization information corresponding to the new financial transaction may be received from the payment processing service. This step may be the same or similar as step 403 of FIG. 4.

In step 506, the computing device may determine whether to authorize the new financial transaction based on the first authorization information and the validated transaction metadata. Such a step may be performed by, e.g., one or more portions of the decision engine 370. This step may be the same or similar as step 405 of FIG. 4. If the computing device determines to authorize the transaction, the flowchart 500 proceeds to step 507a, which may be the same or similar as step 406a of FIG. 4. Otherwise, the flowchart 500 proceeds to step 507b, which may be the same or similar as step 406b of FIG. 5.

Dynamic Transaction Metadata Validation Adjustment Based on Network Conditions

Discussion will now turn to another modification which may be made to the direct data share system in view of time limitations posed by conventional payment processing system. In particular, such a modification may be of particular value where transaction metadata may vary greatly in size and scope.

As a preliminary introduction to FIG. 6, transaction metadata received from one or more merchants may be so voluminous that processing all of the transaction metadata is likely to take quite a long time. Moreover, the transaction metadata may vary in size and scope wildly: some merchants may send a significant quantity of metadata, whereas others might only send a limited quantity, or may omit portions of the transaction metadata which might be otherwise expected. In a circumstance where such transaction metadata has been received, it may be desirable to select, after receipt of the transaction metadata, portions of the transaction metadata for processing so as to avoid unnecessary delays in transaction processing. In other words, rather than selecting such elements in advance (as described above with respect to FIG. 5), it may instead be advantageous to perform such a selection for each set of transaction metadata received. In this manner, a merchant might feel free to send all transaction metadata, and the system can dynamically use such transaction metadata based on various considerations, like a predicted processing speed, existing at that time.

FIG. 6 shows a flowchart 600 showing steps for dynamic configuration of transaction metadata analysis, with a particular focus on selecting portions of received transaction metadata for processing. The flowchart 600 may be performed by one or more computing devices, such as those depicted in FIG. 3. The steps shown in FIG. 6 may be all or portions of an algorithm. A computing device may comprise one or more processors and memory storing instructions that, when executed by the one or more processors, cause the performance of all or portions of the steps of FIG. 6.

In step 601, a predicted time of receipt of authorization information may be determined. This step may be the same or similar as performed in step 501 of FIG. 5.

In step 602, transaction metadata comprising a plurality of data elements corresponding to one or more attributes of a financial transaction may be received via a first interface and from a merchant. Such a step may be performed by, e.g., one or more portions of the data share platform 350. The transaction metadata may be associated with a concurrent transmission of payment information, for the financial transaction, to a payment processing service. The transaction metadata may comprise information regarding one or more items to be purchased via the financial transaction. This step may be the same or similar as step 401 of FIG. 4.

As indicated above, the transaction metadata received in step 601 may potentially be too voluminous to be completely processed. Additionally and/or alternatively, the transaction metadata might not contain a consistent quantity or type of data: for example, the transaction metadata might sometimes contain GPS data, whereas in other instances it might not. Given that the transaction metadata might vary widely, the system might not be able to anticipate what elements will be received, and thus the system cannot decide in advance which elements to process (as might be the case in, for example, FIG. 5).

In step 603, it may be determined whether all of the transaction metadata can be processed given the average time of receipt of authorization information determined in step 601. Such a step may be performed by, e.g., one or more portions of the data share platform 350 and/or the decision engine 370. In other words, given the transaction metadata received in step 602, the system may determine whether all elements may be validated and processed before the authorization information is expected to be received. If not all of the transaction metadata can be processed, the system proceeds to step 604. On the other hand, if all of the transaction metadata can be processed, the system proceeds to step 605.

Determining whether all of the transaction metadata can be processed given the average time of receipt of authorization information may comprise determining an expected time of processing one or more portions of the transaction metadata. It might not be possible to accurately estimate the time to process transaction metadata, particularly where received transaction metadata might be particularly complicated or voluminous. As such, various estimating techniques might be used. For example, the expected time of processing one or more portions of the received transaction metadata might be determined based on a count of data elements of the received transaction metadata, a file size of the received transaction metadata, historical processing times of similar transaction metadata (e.g., from a similar merchant or point-of-sale system), or the like.

In step 604, a subset of the plurality of data elements may be selected to validate based on one or more criteria. Such a step may be performed by, e.g., one or more portions of the data share platform 350 and/or the decision engine 370. Such a step may be particularly useful where the transaction metadata is particularly voluminous, such that processing of all of the transaction metadata might be undesirably slow.

The subset selected may be selected based on the estimated time of receipt, from a payment processing service that processes payment information, of authorization information corresponding to the financial transaction, as determined in step 601. As indicated above with respect to FIG. 4, this estimated time of receipt might be associated with a particular time or particular processing conditions, such that it might be an estimated time of receipt for the immediate transaction. For example, on a particularly busy day, authorization information might be taking longer to receive than normal, allowing more time for processing of additional transaction metadata received from a merchant. As another example, because fewer transactions might occur in the evening, additional processing resources might be available during the evening, such that more transaction metadata may be processed in the evening as compared to during the day—even if the authorization information takes roughly the same amount of time to be received.

Selecting the subset of the plurality of data elements of the received transaction metadata may be performed by selecting a combination of the one or more data elements such that a sum of time periods corresponding to the subset is less than or equal to the average time of receipt of the authorization information determined in step 601. As was the case with respect to FIG. 5, selecting the subset of the one or more data elements of the received transaction metadata may be based on a priority of at least one of the one or more data elements. Selecting the subset of the one or more data elements of the received transaction metadata may additionally and/or alternatively be based on a complexity of at least one of the one or more data elements. For example, if one data element requires significant amounts of time to validate and/or process, it might not be included.

Selecting the subset of the one or more data elements of the received transaction metadata may be based on determining an estimated time of processing for all or portions of the received transaction metadata. For example, selecting the subset of the one or more data elements of the received transaction metadata may comprise determining, for the one or more data elements, a respective time period corresponding to validation and/or processing. For instance, the system may individually process and time each element of the one or more data elements, and then determine a plurality of data elements that have time which, when summed, is less than or equal to the average time of receipt of authorization information determined in step 501. That said, exactitude is not required to determine such time periods: because speed is critical, and because estimating the time periods might itself take time, rough approximations might be used in some circumstances.

Selecting the subset of the one or more data elements of the received transaction metadata may be performed by receiving user input specifying one or more data elements that are expected to be received in the transaction metadata. Such user input may comprise an indication of which data elements are considered of particular importance such that, if they are received, they should be processed. For example, if the geographical location of a device associated with a transaction is received, it might be of particular use in determining the veracity of a transaction. In such a circumstance, the user input might comprise an indication that the data element should be processed.

Selecting the subset of the one or more data elements may be performed on a periodic basis, such as the quantity and/or identity of the selected one or more data elements may change over time. In this manner, changes to the system (e.g., increases in processing power, added transaction volume, etc.) may be take into consideration when selecting which of the one or more data elements should be processed when transaction metadata is received. For example, the subset of the one or more data elements may be selected every week, such that changes to network speed, storage device speed, processor speed, or the like may be taken into account.

In step 605, transaction metadata may be validated and/or processed. Such a step may be performed by, e.g., one or more portions of the data share platform 350. If a subset of the transaction metadata was selected, then only the subset of the plurality of data elements would be validated and/or processed. Validating the transaction metadata may comprise at least validating a transaction data element of the transaction metadata. Validating the transaction metadata may be based on a location associated with the financial transaction. Validating the transaction metadata may be based on one or more of an identity of the one or more items, a quantity of the one or more items, whether the one or more items comprise a gift card, a price associated with the one or more items, and/or whether the one or more items are regularly ordered by a customer associated with the payment information. Processing the transaction metadata may comprise determining whether one or more portions of the transaction metadata indicate that the transaction is valid and/or should be authorized. This step may be the same or similar as step 402 of FIG. 4.

In step 606, the authorization information may be received via the second interface and from the payment processing service. This step may be the same or similar as step 403 of FIG. 4.

In step 607, a computing device may determine whether to authorize the financial transaction based on the authorization information and the validated transaction metadata. Such a step may be performed by, e.g., one or more portions of the decision engine 370. This step may be the same or similar as step 405 of FIG. 4. If the computing device determines to authorize the financial transaction, the flowchart 600 may proceed to step 608*a*. Otherwise, the flowchart 600 may proceed to step 608*b*. If the computing device determines to authorize the transaction, the flowchart proceeds to step 608*a*, which may be the same or similar as step 406*a* of FIG. 4. Otherwise, the flowchart proceeds to step 608*b*, which may be the same or similar as step 406*b* of FIG. 5.

Enhanced Feedback Exposure for Merchants Based on Transaction Metadata

Discussion will now turn to the benefits of using the transaction metadata to augment traditional payment processing services. In particular, one advantage of using transaction metadata during payment processing is that such metadata may be later used to provide insight into transactions to merchants when transactions are deemed fraudulent or disputed.

Figure 7:
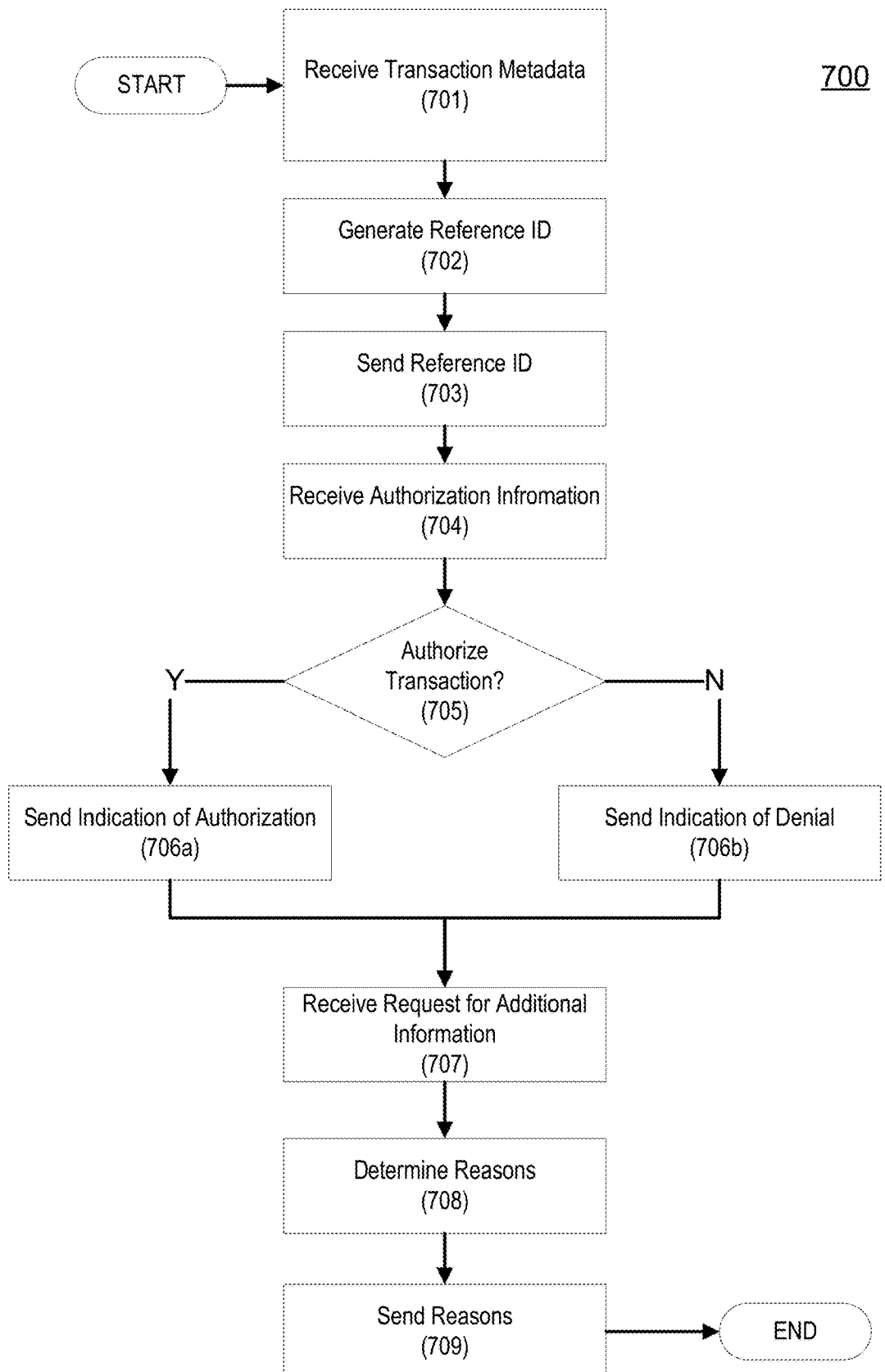
FIG. 7 depicts a flowchart comprising steps detailing providing merchants with information corresponding to transaction authorization decisions.

As a preliminary introduction to FIG. 7, transaction metadata may be useful for providing stakeholders, such as merchants, additional insight into transactions. After all, such information might not only remind the merchant about past transactions, but might provide key insight into the types of transactions that will be granted and/or denied. Moreover, such information may be valuable for accounting purposes. That said, some portions of transaction metadata may be confidential (in that, e.g., it uniquely identifies individuals, provides credit card numbers, or the like), such that it should not be provided to merchants under any circumstances. Moreover, given the volume and detail of transaction metadata (as, after all, it could be hundreds of megabytes of idiosyncratic detail), it may be advantageous to provide stakeholders, such as merchants, straightforward ways to access this transaction metadata when desired without inundating those same merchants with unnecessary or unhelpful detail. That said, providing merchants and/or other stakeholders all transaction metadata might be undesirable, as it might provide fraudsters insight into how to create fraudulent transactions which simulate real transactions. Additionally, merchant login information might be improperly used by unauthorized users, such that it may be desirable to limit the amount of transaction metadata accessible by a merchant for security purposes. Thus, the system cannot simply provide merchants unrestricted access to transaction metadata, even if those same merchants provided some or all of the transaction metadata.

FIG. 7 shows a flowchart 700 showing steps for providing information associated with a financial transaction. The flowchart 700 may be performed by one or more computing devices, such as those depicted in FIG. 3. The steps shown in FIG. 7 may be all or portions of an algorithm. A computing device may comprise one or more processors and memory storing instructions that, when executed by the one or more processors, cause the performance of all or portions of the steps of FIG. 7.

In step 701, transaction metadata comprising one or more data elements corresponding to one or more attributes of a financial transaction may be received via a first interface and from a merchant. Such a step may be performed by, e.g., one or more portions of the data share platform 350. For example, the transaction metadata may comprise information regarding one or more items to be purchased via the transaction. This step may be the same or similar as step 401 of FIG. 4.

In step 702, a reference ID for the financial transaction may be generated. Such a step may be performed by, e.g., one or more portions of the data share platform 350. The reference ID may be any identifier of the financial transaction. Generating the reference ID may comprise generating the reference ID such that it uniquely identifies the financial transaction. For example, the reference ID may be a unique identifier of the financial transaction, such as a unique string of numbers and/or characters. The reference ID may be a combination of various elements of the transaction metadata, such as an identifier of a merchant associated with the financial transaction, an identifier of a time period associated with the financial transaction, or the like. The reference ID may be based, in whole or in part, on an identity of the merchant.

In step 703, the reference ID may be sent to the merchant. Such a step may be performed by, e.g., one or more portions of the data share platform 350. The reference ID may be transmitted to the merchant via, for example, the server 302. The reference ID may additionally and/or alternatively stored in a database, such as the database 311. The reference ID may be sent and/or stored in a manner that associates the reference ID with the transaction metadata. The reference ID may be a secret and might be sent only to the merchant. Though step 703 is depicted as occurring before step 704, step 703 may be performed at many different times. For instance, the reference ID might be sent to the merchant a month after a transaction is completed.

One method in which the reference ID may be sent to the merchant may be a periodic accounting or similar reporting document. For example, the system may transmit, on a weekly basis, a report of all transactions to the merchant. Such a report may comprise, among other things, a listing of the reference IDs for various transactions, along with corresponding payment amounts and related details.

In step 704, authorization information may be received via a second interface and from a payment processing service. Such a step may be performed by, e.g., one or more portions of the decision engine 370. The authorization information may correspond to the financial transaction. The authorization information may indicate processing of payment information by the payment processing service. The payment processing service may be a credit card network associated with the payment information. This step may be the same or similar as step 403 of FIG. 4.

In step 705, a computing device may determine, based on the transaction metadata and the authorization information, whether to authorize the transaction. This step may be the same or similar as step 405 of FIG. 4. Such a step may be performed by, e.g., one or more portions of the decision engine 370. If the computing device determines to authorize the financial transaction, the flowchart 700 may proceed to step 706a, which may be the same or similar as step 406a of FIG. 4. Otherwise, the flowchart 700 may proceed to step 706b, which may be the same or similar as step 406b of FIG. 4.

As part of determining whether to authorize the transaction, all or portions of the transaction metadata may be stored in a database. Storing all or portions of the transaction metadata may advantageously allow the system to refer back to the transaction metadata when, for example, later considering reasons why a transaction may have been denied (as discussed below). The transaction metadata may be stored in a database as correlated with the reference ID generated in step 702.

In step 707 a request for additional information may be received from the merchant. Such a step may be performed by, e.g., one or more portions of the data share platform 350. The request for additional information may comprise the reference ID. In this manner, the merchant may request additional detail as to why the transaction may have been denied.

A request for additional information may be received from the merchant in a variety of circumstances. In some circumstances, the merchant may provide, through a device (e.g., a point-of-sale device), an indication of the reference ID, thereby requesting the one or more reasons determined in step 706b. Such a request could be as simple as pressing a "Why?" button on a computing device, or inputting the reference ID into a particular form. Additionally and/or alternatively, the request for additional information may be part of an accounting and/or resolution process using another computing device. For example, a series of reference IDs may be received from a merchant device, each corresponding to a transaction for which the merchant requests more detail.

The request for additional information need not indicate that a transaction was denied. Such requests may be received based on, for example, a merchant investigating more detail about a past transaction for accounting purposes, and/or as part of a merchant learning to distinguish between valid and invalid transactions. Other reasons why a merchant may request additional information may include verifying an e-mail address of a customer, validating that a customer purchased a particular item in the past (e.g., for the purposes of digital rights management), or the like.

In step 708, one or more reasons why the financial transaction was or was not authorized may be determined. Such a step may be performed by, e.g., one or more portions of the data share platform 350 and/or the decision engine 370. Such reasons need not relate to all of the transaction metadata, but may instead be a summary of the reasons why the system approved or denied a transaction. For example, hundreds of different data elements may have been considered as part of an authorization decision, but the primary reason (e.g., "the transaction originated from an unexpected location") may be the only reason stored. For example, the financial transaction may have been authorized (or might not have been authorized) because the computing device may have determined that the financial transaction is associated with a trusted or an untrusted location. In such a circumstance, the one or more reasons may indicate the location. The one or more reasons may be based on, for example, an identity of the one or more items, a quantity of the one or more items, whether the one or more items comprise a gift card, a price associated with the one or more items, and/or whether the one or more items are regularly ordered by a customer associated with the payment information.

The steps depicted in FIG. 7 may be reordered as desired, and need not be performed in the manner shown in FIG. 7. For example, determining the one or more reasons in step 708 may be performed before receiving the request for additional information in step 707 because the reasons might be determined in advance, stored in a database, and accessed upon demand. As a particular example of this implementation, a computing device may be configured to store, in a database (e.g., the database 311), reasons for approval or denial along with transaction metadata and authorization information. Such storage not only would be of value for training a machine learning model, but would also be useful such that, if the request for additional information in step 707 is received much later, the reasons would be preserved and available for access.

In step 709, information corresponding to the determined one or more reasons may be sent to, e.g., the merchant. Such a step may be performed by, e.g., one or more portions of the data share platform 350. The information may be sent in response to the request for additional information. The one or more reasons may be queried from a database using the reference ID and sent to the merchant. Sending the information corresponding to the one or more reasons may comprise obfuscating, from the information, personal data. For example, names of individuals involved in the transaction may be obfuscated. Sending the data corresponding to the one or more reasons is based on authenticating credentials unique to the merchant. Such credentials may be received from, e.g., the merchant and as part of the request for additional information. The information corresponding to the one or more reasons may indicate that a user associated with the financial transaction is not permitted to use a payment method corresponding to the payment information. For example, the information may indicate that a certain individual is untrusted. As another example, the computing device may have determined that the financial transaction is not authorized because the financial transaction is associated with delivery of an item to a location, and the one or more reasons may indicate the location. In this manner, the merchant might learn that customers from certain locations (e.g., certain countries) are untrusted. As yet another example, the information may indicate that transaction metadata was received too late to make a sufficiently quick decision.

Enhanced Feedback Exposure for Users Based on Transaction Metadata

Figure 8:
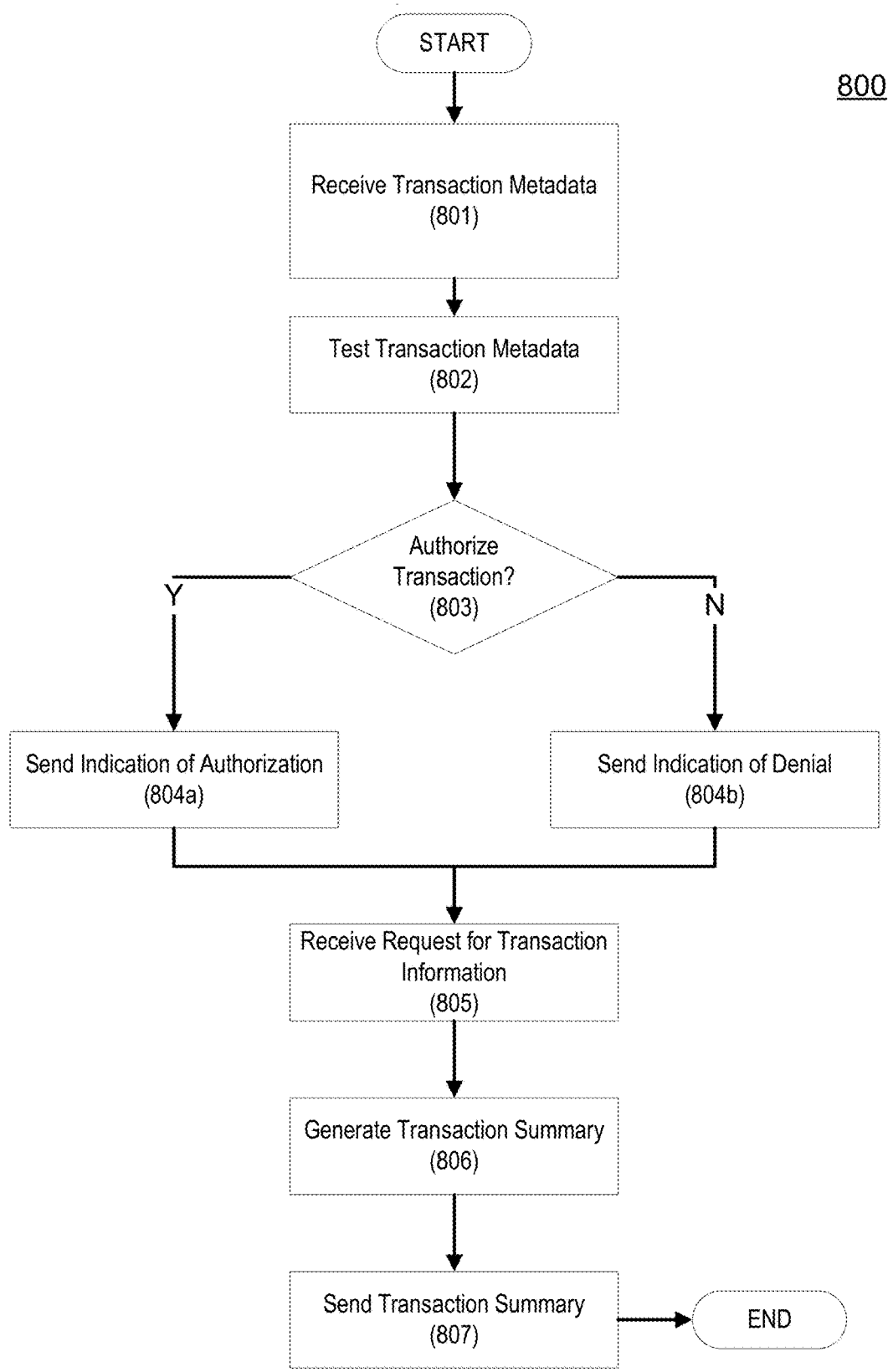
FIG. 8 depicts a flowchart comprising steps detailing providing information about historical transactions.

As a preliminary introduction to FIG. 8, transaction metadata may be used to help provide outside parties, such as customers, with details on transactions. For example, customers may inquire about the details of past transactions while using banking applications, in effect requesting a digital receipt with deep levels of information about the transactions they have been involved in. As such, it may be desirable to implement methods for providing third parties, like customers, a limited view into the particularities of various transactions. That is particularly the case where some aspects of transaction metadata must be kept a secret for security purposes. That said, such a view must necessarily be limited, as too much insight into authorization processes might provide third parties ideas on how to better effectuate fraud.

FIG. 8 shows a flowchart 800 showing steps for providing transaction metadata information after transaction authorization. The flowchart 800 may be performed by one or more computing devices, such as those depicted in FIG. 3. The steps shown in FIG. 8 may be all or portions of an algorithm. A computing device may comprise one or more processors and memory storing instructions that, when executed by the one or more processors, cause the performance of all or portions of the steps of FIG. 8.

In step 801, transaction metadata comprising one or more data elements corresponding to one or more attributes of a financial transaction may be received via a first interface and from a merchant. Such a step may be performed by, e.g., one or more portions of the data share platform 350. The transaction metadata may be associated with a concurrent transmission of payment information, for the financial transaction, to a payment processing service. This step may be the same or similar as step 401 of FIG. 4.

In step 802, the transaction metadata may be tested based on one or more criteria. Such a step may be performed by, e.g., one or more portions of the data share platform 350. Testing the transaction metadata may comprise selecting a portion of the one or more data elements to test using the one or more criteria. This step may be the same or similar as steps 402 and/or 404 of FIG. 4.

In step 803, a computing device may determine whether to authorize the financial transaction based on the tested transaction metadata and based on authorization information that indicates processing of the payment information by the payment processing service. Such a step may be performed by, e.g., one or more portions of the decision engine 370. The authorization information may correspond to the financial transaction. The authorization information may have been received from the payment processing service. If the computing device determines to authorize the financial transaction, the flowchart 800 may proceed to step 804a. This step may be the same or similar as step 405 of FIG. 4. Otherwise, the flowchart 800 may proceed to step 804b. If the computing device determines to authorize the transaction, the flowchart proceeds to step 804a, which may be the same or similar as step 406a of FIG. 4. Otherwise, the flowchart proceeds to step 804b, which may be the same or similar as step 406b of FIG. 4.

In step 805, a request for transaction information associated with the financial transaction may be received. Such a step may be performed by, e.g., one or more portions of the data share platform 350. The request may be received from a user device, such as a device of the customer that initiated the transaction. Additionally and/or alternatively, the request may be received from a merchant. The request may be received after determining whether to authorize the financial transaction. For example, the request may be associated with a user requesting information about a transaction that they forgot about.

The request for transaction information need not suggest that the transaction was denied. For example, the request for transaction information might be received from a user that forgot about a transaction, and/or a user that is reviewing past transactions for the purposes of accounting.

The request for transaction information received in step 805 may comprise a unique transaction reference identifier. For example, the unique transaction reference identifier may be an alphanumeric string that uniquely identifies a particular transaction, such as the transaction corresponding to the transaction metadata received in step 801. As another example, the unique transaction reference identifier may comprise one or more portions of a credit card number, a transaction amount, or the like. Virtually any data may comprise a unique transaction reference identifier, so long as it may be used to uniquely identify a transaction. The unique transaction reference identifier may have been generated as part of step 803, 804a, and/or 804b.

Such an identifier might be received by, for example, a user clicking on a button in a banking application. Additionally and/or alternatively, such an identifier may be received as part of a customer service platform, such that a customer may call in to a customer service line and, with the help of an agent, provide the request to a computing device.

In step 806, a transaction summary may be generated. Such a step may be performed by, e.g., one or more portions of the data share platform 350. The transaction summary may be generated in response to the request for the transaction information. The transaction summary may be generated based on the transaction metadata. For example, the transaction summary might be a subset of all information (e.g., transaction metadata) available about the transaction. The transaction summary may indicate one or more items purchased by the financial transaction. For example, the transaction summary might itemize which items were purchased at a particular time and at a particular store. The transaction summary may indicate one or more reasons why the financial transaction was authorized. For example, the transaction summary might indicate that, because of the low cost of the items and/or the location of the transaction, the transaction was authorized. The transaction summary may indicate a device used to initiate the financial transaction. For example, the transaction summary might indicate that the transaction was conducted on a certain smartphone or via a certain website.

Generating the transaction summary may comprise selecting one or more portions of the transaction metadata to include in the transaction summary. For example, personally identifying information might not be included in the transaction summary, whereas item amounts and a time in which a transaction was completed may be included. Generating the transaction summary may additionally and/or alternatively comprise obfuscating one or more portions of the transaction metadata. For example, an identification of a cashier involved in the transaction might not be included in the transaction summary, and/or the identification might be replaced with a generic identifier (e.g., "Cashier 1"). In this manner, confidential or otherwise sensitive aspects of transaction metadata may be kept from an individual, but roughly similar information may be provided. This may be particularly valuable where such information could potentially be used to effectuate fraud.

Before generating the transaction summary, a computing device may determine that the user device is authorized to access information about the financial transaction. For example, authorization credentials associated with the request in step 805 might be authenticated before the transaction summary is generated. In this manner, should the transaction summary potentially contain sensitive information (e.g., information indicating the purchase of potentially embarrassing goods or services), such information might be protected from unauthorized access.

In step 807, the transaction summary may be sent to, e.g., the user device or another computing device, such as a computing device associated with a call center. Such a step may be performed by, e.g., one or more portions of the data share platform 350. Sending the transaction summary may comprise causing the transaction summary to be displayed as part of an account statement. For example, the transaction summary might be provided to a user as part of a banking application or website. As another example, the transaction summary may be sent to a call center computer such that a call center agent can provide (e.g., over the telephone) information about a transaction.

Parallel Transaction Pre-Authentication Platform

Discussion will now turn to using transaction metadata for pre-authorizing transactions, such as particularly high-value transactions, in order to aid in the security and reliability of those transactions. Such a system, which may augment conventional two-factor authorization systems, can provide merchants a unique way to check, in advance, whether a transaction is trustworthy.

Figure 9:
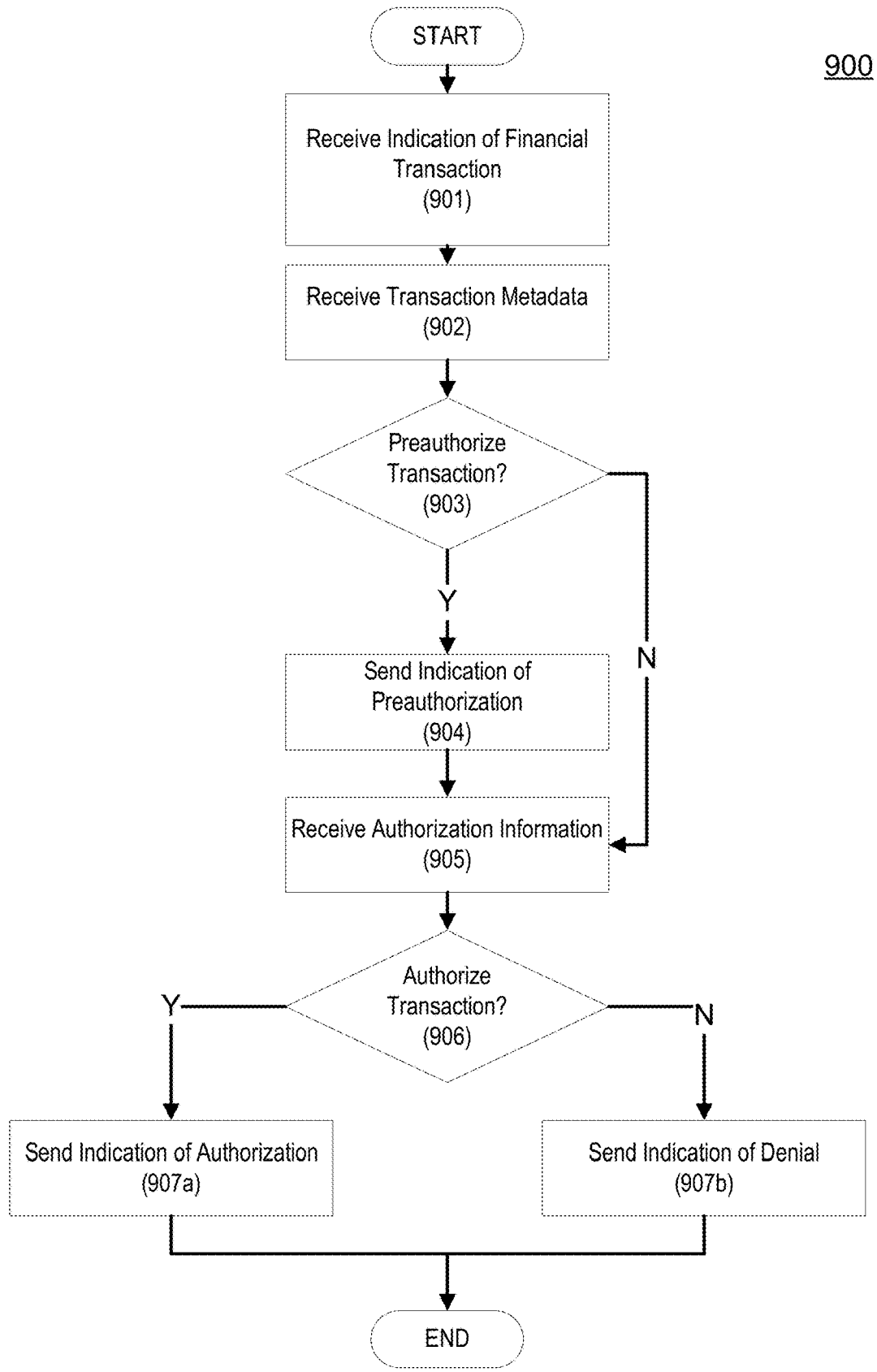
FIG. 9 depicts a flowchart comprising steps detailing pre-authorizing transactions.

As a preliminary introduction to FIG. 9, certain transactions may benefit from additional security processes. For example, high-value or unusual transactions (e.g., those initiated in foreign countries) might benefit from additional authorization steps to combat fraud. In such a circumstance, it may be desirable to use portions of transaction metadata to pre-authorize transactions, such that the possibility of fraud as to those transactions is lessened. This also may advantageously expedite the overall processing speed of transactions, as pre-authorization may be performed long before a payment processing network (e.g., the payment processing service 312a and/or the payment network 312b) is involved. With that said, such pre-authorization need not necessarily involve all of the steps that are involved in a complete authorization—after all, there may be a possibility that the transaction is cancelled even if successfully authorized.

FIG. 9 shows a flowchart 900 showing steps for preauthorizing financial transactions. The flowchart 900 may be performed by one or more computing devices, such as those depicted in FIG. 3. The steps shown in FIG. 9 may be all or portions of an algorithm. A computing device may comprise one or more processors and memory storing instructions that, when executed by the one or more processors, cause the performance of all or portions of the steps of FIG. 9.

In step 901, a system (such as any of the devices shown as part of the data share platform 350 of FIG. 3) may receive an indication of a transaction from a merchant device (e.g., the merchant transaction source 301 and/or the server 302). The indication need not be in any particular format. The indication may be as simple as an indication that a financial transaction has been initiated with respect to a particular customer and/or a particular merchant. The indication may comprise details about a time of the transaction, an amount of the transaction, a location of the transaction, or the like. The indication may be transmitted based on, for example, a customer placing goods in a virtual cart, a customer placing their credit card in a machine, or the like.

In step 902, transaction metadata associated with the financial transaction may be received from the merchant. Such a step may be performed by, e.g., one or more portions of the data share platform 350. This step may be the same or similar as step 401 of FIG. 4.

In step 903, a computing device (e.g., the authorization decisioning engine 308 of FIG. 3 and/or other portions of the decision engine 370) may determine whether the financial transaction should be and/or is likely to be authorized. The preauthorization described in step 903 might be performed to provide a merchant an indication of whether an upcoming transaction would be authorized, and/or to show the merchant that additional checks have been put in place to expedite subsequent authorization of the financial transaction. In some instances, preauthorization may serve to allow merchants to know when a transaction is likely to be rejected, allowing the transactions to avoid wasting additional time on certain transactions. In other instances, preauthorization may ultimately slow the speed of transactions (e.g., because a customer must use their phone to answer a video or voice call to preauthorize the transaction), but such steps may be desirable to vouchsafe the transaction. If the transaction is preauthorized, the flowchart 900 may proceed to step 904. Otherwise, the flowchart 900 may proceed to step 905.

Preauthorizing the transaction may comprise use of a one-time-use password. As part of step 903, a user may be sent a one-time-use password. Sending the one-time-use password may comprise sending the one-time-use password to a destination associated with a user, such as the user's smartphone, e-mail address, or the like. The user may then use the one-time-use password (e.g., in a form, over the telephone, or the like) to indicate that the user is authorized to conduct the transaction. In this manner, the identity of the user might be confirmed, and/or an e-mail address of the user might be confirmed. Such steps may aid in the overall security of the transaction, and might allow a merchant to readily determine whether a user would be authorized to conduct a future transaction.

Preauthorizing the transaction may be all or portions of a two-factor authorization scheme. As will be discussed further below, preauthorization of a transaction need not be required to allow a transaction to proceed. That said, preauthorization of a transaction may provide additional security for transactions and, in some instances, may permit subsequent authorization steps to be somewhat more simple or reliable. Determining whether to preauthorize the financial transaction may comprise sending a request for authorization of the financial transaction to a user device. Sending the request for authorization of the financial transaction to the user device may comprise sending, to the user device, an authorization code. Sending the request for authorization of the financial transaction to the user device may comprise initiating a video or voice call to the user device. Determining whether to preauthorize the financial transaction may comprise receiving, from the user device, a response to the request for authorization of the financial transaction. The response to the request for authorization may comprise the authorization code. The response to the request for authorization may comprise a unique credential associated with the user. Determining whether to preauthorize the financial transaction may be based on an identity of the user. For example, a transaction might only be preauthorized for certain users of a credit card or banking account.

One reason why preauthorization may be useful is that it may allow for slower, but more robust, analysis of transaction metadata. As indicated above (with respect to, e.g., FIGS. 5 and 6), time delays in authorizing financial transactions are generally unwelcome. By conducting the pre-authorization before traditional payment processing systems even begin (e.g., before transmission 330a of FIG. 3), additional time can be gained and used to authorize a transaction. Stated differently, the pre-authorization process can perform validation and processing of transaction metadata well before a payment processing service ever begins considering whether to authorize a transaction, such that the transaction may still be conducted quickly (and, e.g., in accordance with applicable network timing requirements). With that said, the pre-authorization process need not be performed at a particular time before other authorization steps are performed.

Determining whether to preauthorize the financial transaction may comprise testing the transaction metadata based on one or more criteria. In other words, step 903 may comprise all or portions of step 405 of FIG. 4. Because preauthorization may provide for a substantial amount of time as compared to traditional authorization steps (as described in, for example, FIG. 4), many more data elements of transaction metadata may be received and considered, and much lengthier validation and processing steps may be performed. In other words, many of the concerns discussed with FIGS. 5 and 6 (e.g., limited time periods for validation and processing requiring selection of all or portions of transaction metadata to be processed) are not as strong. Such additional validation and processing may itself be a reason to encourage merchants to pre-authorize transactions, particularly where high-value transactions are concerns. That said, preauthorizing the transaction need not comprise making all determinations that are required for fully authorizing a financial transaction. The preauthorization might comprise only a fraction of steps required to fully authorize a transaction.

Transactions might be preauthorized because they satisfy certain preconditions. For example, high-value and/or high-risk transactions might require preauthorization, whereas low-value and/or low-risk transactions might not. Transactions in foreign countries might require preauthorization, whereas transactions at a home of an owner of a payment method might not. The decision as to whether a transaction requires preauthorization might be made by a merchant (e.g., via code executing on the server 302).

In step 904, an indication of whether the financial transaction is preauthorized may be sent to the merchant device. Such a step may be performed by, e.g., one or more portions of the data share platform 350. Sending the indication of whether the financial transaction is preauthorized may comprise sending, to the merchant device, instructions configured to cause the merchant device to send the payment information to the payment processing service. In other words, further steps by the merchant device might be conditioned on receiving a preauthorization. In this way, the merchant device may be configured to send the payment information to the payment processing service in response to the indication of whether the financial transaction is preauthorized.

In step 905, authorization information may be received. Such a step may be performed by, e.g., one or more portions of the decision engine 370. The authorization information may be received after sending the indication of whether the financial transaction is preauthorized. The authorization information may be received from a payment processing service. The authorization information may corresponding to the financial transaction. The authorization information may indicate processing, by the payment processing service, of payment information associated with the financial transaction. As indicated above, the authorization information may be received after the pre-authorization (e.g., steps 903 and 904) has been conducted, such that subsequent authorization steps (e.g., step 906, described below) can be conducted quickly (and, e.g., in accordance with applicable payment network timing requirements). The authorization information may indicate whether the payment information was approved by the payment processing service. This step may be the same or similar as step 403 of FIG. 4.

In step 906, a computing device may determine whether to authorize the transaction. Such a step may be performed by, e.g., one or more portions of the decision engine 370. Determining whether to authorize the transaction may be based on determining that the financial transaction was preauthorized. The steps used to determine whether to authorize the transaction in step 906 may be based on those already performed as part of the pre-authorization: for example, if the pre-authorization performs substantially all checks required, then the determination in step 906 may be significantly simpler. Determining whether to authorize the transaction may be based on the authorization information and/or may comprise selecting a portion of one or more data elements of the transaction metadata (e.g., those not tested during preauthorization) to test using the one or more criteria. This step may be the same or similar as step 405 of FIG. 4. If the computing device determines to authorize the financial transaction, the flowchart 900 may proceed to step 907a. Otherwise, the flowchart 900 may proceed to step 907b. If the computing device determines to authorize the transaction, the flowchart proceeds to step 907a, which may be the same or similar as step 406a of FIG. 4. Otherwise, the flowchart proceeds to step 907b, which may be the same or similar as step 406b of FIG. 4.

Transaction Metadata-Enabled Dispute and Fraud Claim Resolution

Discussion will now turn to ways in which transaction metadata may be stored and used to later address fraud claims related to historical transactions. This process may allow for consumers to raise transaction disputes and thereby access additional quantities of data about a past transaction.

Figure 10:
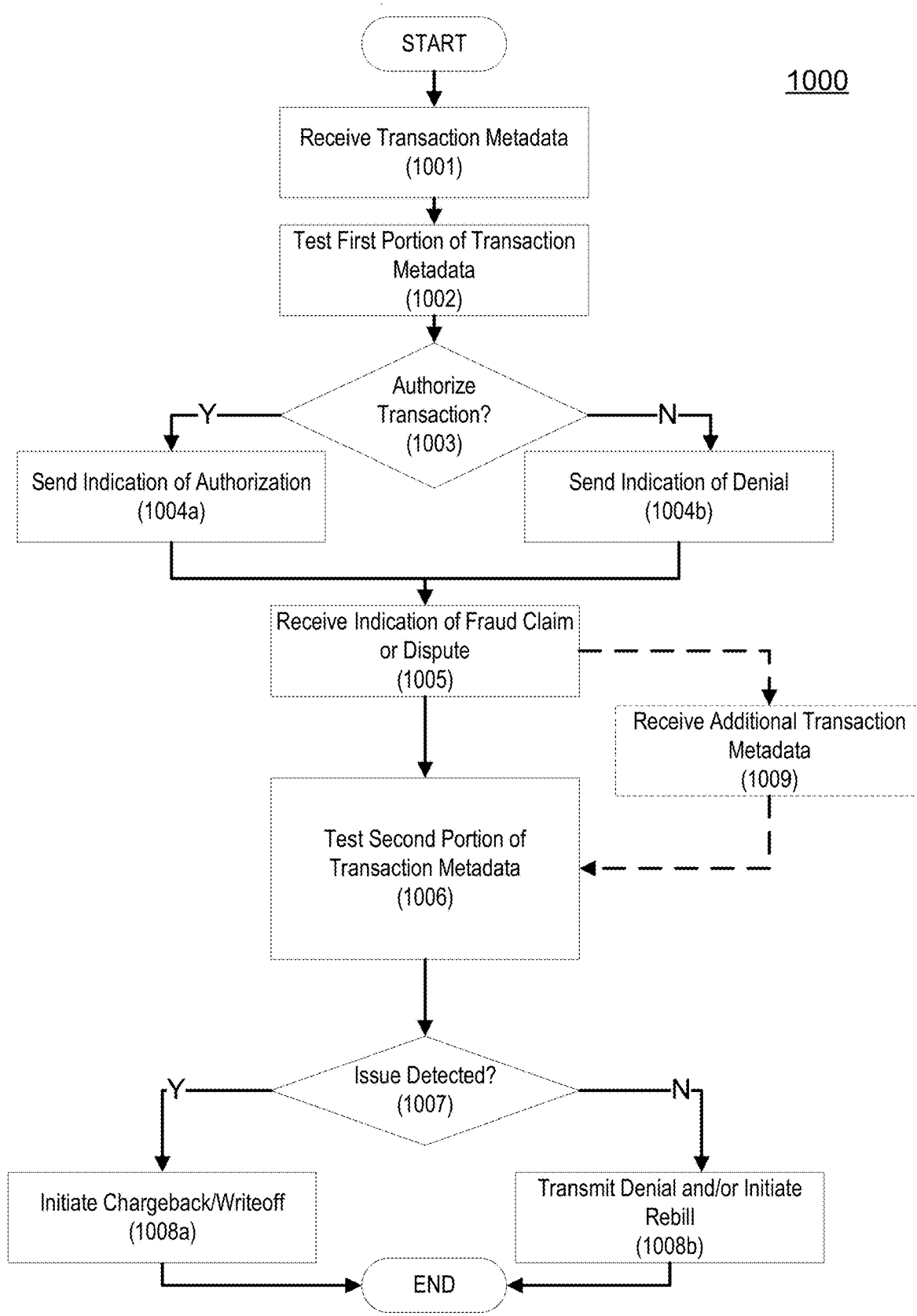
FIG. 10 depicts a flowchart comprising steps detailing transaction resolution.

As a preliminary introduction to FIG. 10, various individuals may dispute the validity of past transactions. Such disputes may be resolved through further analysis of transactions, and in particular further processing of transaction metadata (e.g., processing of transaction metadata that might not have been processed when the transaction was initially approved). For example, where an initial authorization process might have only validated and processed a fraction of transaction metadata, a dispute might suggest it would be beneficial to later validate and process all portions of the same transaction metadata. As such, it may be useful to perform additional processing of transaction metadata responsive to a determination that a corresponding transaction may be alleged to be fraudulent.

FIG. 10 shows a flowchart 1000 showing steps for addressing disputes with transactions using transaction metadata. The flowchart 1000 may be performed by one or more computing devices, such as those depicted in FIG. 3. The steps shown in FIG. 10 may be all or portions of an algorithm. A computing device may comprise one or more processors and memory storing instructions that, when executed by the one or more processors, cause the performance of all or portions of the steps of FIG. 10.

In step 1001, transaction metadata comprising one or more data elements corresponding to one or more attributes of a financial transaction may be received. Such a step may be performed by, e.g., one or more portions of the data share platform 350. The transaction metadata may have been received via a first interface and from a merchant device. The transaction metadata may be associated with a concurrent transmission of payment information, for the financial transaction, to a payment processing service. This step may be the same or similar as step 401 of FIG. 4.

In step 1002, a first portion of the transaction metadata may be tested based on one or more criteria. Such a step may be performed by, e.g., one or more portions of the data share platform 350. Testing the transaction metadata may comprise selecting a portion of the one or more data elements to test using the one or more criteria. Testing the first portion of the metadata may be the same or similar as the validation and processing steps described with respect to step 402 of FIG. 4.

In step 1003, a decision may be made as to whether to authorize the financial transaction based on the tested first portion of the transaction metadata and based on authorization information that indicates processing of the payment information by the payment processing service. Such a step may be performed by, e.g., one or more portions of the decision engine 370. The authorization information may correspond to the financial transaction. The authorization information may be received from the payment processing service. This step may be the same or similar as step 405 of FIG. 4. If the computing device determines to authorize the financial transaction, the flowchart 1000 may proceed to step 1004a. Otherwise, the flowchart 1000 may proceed to step 1004b. If the computing device determines to authorize the transaction, the flowchart proceeds to step 1004a, which may be the same or similar as step 406a of FIG. 4. Otherwise, the flowchart proceeds to step 1004b, which may be the same or similar as step 406b of FIG. 4.

In step 1005, an indication of a dispute and/or fraud claim associated with the financial transaction may be received from a computing device. Such a step may be performed by, e.g., one or more portions of the data share platform 350. The indication of the dispute and/or fraud claim associated with the financial transaction may correspond to a user disputing a validity of the financial transaction. For example, a user might have forgotten that they approved a financial transaction, and might later send a merchant a dispute of and/or fraud claim associated with the transaction. In such a circumstance, the user might be mistaken, and the information contained in transaction metadata might help remedy such confusion. Such an indication need not be in any particular format or style.

A dispute and/or fraud claim for a financial transaction may indicate, in whole or in part, that validation and/or processing of transaction metadata was, in some way, deficient or incorrect. This might particularly be the case where, for example, the first portion of the transaction metadata tested in step 1002 was too small, simplistic, or otherwise not sufficiently probative of transaction validity, where the transaction metadata misrepresented the transaction, where goods and/or services indicated by the transaction metadata were not in fact provided, or the like. For example, a dispute may correspond to a good or service not being received, whereas a fraud claim may correspond to a transaction being wholly or partially fraudulent. Along those lines, should such transaction metadata be processed using a machine learning algorithm, disputes related to such transactions may be used as training data to indicate that processing may have been inadequate.

In step 1006, a second portion of the transaction metadata may be tested. Such a step may be performed by, e.g., one or more portions of the data share platform 350. Testing the second portion of the metadata may be the same or similar as the validation and processing steps described with respect to step 402 of FIG. 4. The second portion of the transaction metadata may be tested in response to receiving the indication of the dispute and/or fraud claim associated with the financial transaction. For example, based on receiving the dispute and/or fraud claim, the transaction might be tested using more time-consuming but probative criteria in order to determine if the transaction might, in fact, have been fraud. The second portion of the transaction metadata may be determined based on the indication of the dispute and/or fraud claim associated with the financial transaction. For example, a fraud claim might suggest that the transaction was performed in a foreign country, and the second portion of the transaction metadata might relate to the geographical location of the transaction. The tested second portion of the transaction metadata may indicate a validity of the financial transaction. In other words, the tested second portion of the transaction metadata might indicate the correctness of the dispute and/or fraud claim.

The second portion of the transaction metadata may be received from outside sources, such as the merchant device. For example, as indicated by optional step 1009, the second portion of the transaction metadata may be received from the merchant device and after receiving the indication of the dispute associated with the financial transaction from the computing device. For example, based on a dispute received from a customer, a merchant might provide additional information about the transaction that is probative as to the validity of the transaction.

In step 1007, a decision may be made as to whether an issue is detected with respect to the transaction based on the tested second portion of the transaction metadata, the tested first portion of the transaction data, and/or based on authorization information that indicates processing of the payment information by the payment processing service. Such a step may be performed by, e.g., one or more portions of the decision engine 370. Such issues may comprise instances of potential fraud or other similar transaction problems which might merit a transaction chargeback, write-off, or the like. In other words, the decision may comprise looking for reasons why a change may be required with respect to the transaction. If an issue is detected, the flow chart may proceed to step 1008a. Otherwise, the flow chart may proceed to step 1008b.

In step 1008a, the system may initiate a chargeback or write-off based on the issue detected in step 1007. In other words, step 1008a may correspond to a circumstance where an issue has been found, and steps must be taken to rectify the identified issue.

In contrast, in step 1008b, the system may transmit a denial (e.g., to the source where the indication of the fraud claim or dispute was received in step 1005) and/or may initiate a rebill (e.g., if the user had been improperly refunded). For example, as part of step 1008b, a user might be provided an indication that the transaction appears legitimate.

Examples of Payment Information and Transaction Metadata

FIG. 11 depicts an example of the difference between payment information 1101 and transaction metadata 1102. Such information is illustrative, and is depicted to illustrate the two in comparison.

The payment information 1101 comprises a credit card number 1103a, a CVV, and a total payment amount 1103c. Such information may be the traditional information provided to a payment processing service. As indicated by FIG. 11, such information is typically quite limited, and has limited use in determining the validity of a financial transaction.

The transaction metadata 1102 comprises a listing of goods and services 1104a, a listing of the prices of those goods and services 1104b, a transaction location 1104c, a user device IP address 1104d, and a user device MAC address 1104e. The listing of goods and services 1104a and the list of the prices of those goods and services 1104b, as indicated above, may be used to determine whether a transaction is fraudulent. For example, the purchase of a large quantity of gift cards may indicate a transaction may be fraudulent. The transaction location 1104c, the user device IP address 1104d, and the user device MAC address 1104e may be used as indicators of whether an authorized user conducted a transaction. For example, transactions originating in unexpected countries and/or from unexpected devices (e.g., a new laptop connected to the Internet in a café in an unexpected foreign country) might not be trusted as compared to transactions originating in expected countries and from devices known to be associated with a known customer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing information corresponding to one or more reasons relating to an authorization decision for a payment card transaction between a merchant and a user, the method comprising:
   receiving, by a computing device and from a merchant device via a first application programming interface (API), supplemental transaction metadata comprising one or more data elements corresponding to one or more attributes of the payment card transaction, wherein the supplemental transaction metadata is associated with a concurrent transmission of payment card information, for the payment card transaction, by the merchant device to a payment processing service;
   storing, by the computing device and in a database, at least a portion of the supplemental transaction metadata;
   receiving, by the computing device and from the payment processing service via a second interface different from the first API, payment card authorization information corresponding to the payment card transaction, wherein the payment card authorization information indicates whether the payment card information was approved by the payment processing service;
   determining, by the computing device, based on timing requirements of the payment processing service, and based on the supplemental transaction metadata received from the merchant device and the payment card authorization information received from the payment processing service, whether the payment card transaction is authorized;
   determining, by the computing device, one or more reasons why the payment card transaction was or was not authorized;
   sending, by the computing device, to the merchant device, and based on the payment card authorization information and the supplemental transaction metadata, an authorization decision indicating whether the payment card transaction was authorized;
   receiving, by the computing device and from the merchant device, a request for additional information, wherein the request for additional information comprises a reference identification (ID);
   determining information corresponding to the determined one or more reasons by retrieving, from the database and based on the reference ID, the at least the portion of the supplemental transaction metadata; and
   sending, by the computing device, to the merchant device, and in response to the request for additional information, the information corresponding to the determined one or more reasons.

2. The method of claim 1, wherein determining the information corresponding to the determined one or more reasons comprises querying the database using the reference ID.

3. The method of claim 1, wherein the reference ID uniquely identifies the payment card transaction.

4. The method of claim 1, wherein sending the information corresponding to the determined one or more reasons comprises:
   obfuscating, from the information, personal data.

5. The method of claim 1, further comprising:
   receiving credentials unique to the merchant, wherein sending the information corresponding to the determined one or more reasons is based on authenticating the credentials.

6. The method of claim 1, wherein determining whether the payment card transaction is authorized comprises determining that the payment card transaction is in an untrusted location, and wherein the determined one or more reasons indicate the untrusted location.

7. The method of claim 1, wherein the information corresponding to the determined one or more reasons indicates that a user associated with the payment card transaction is not permitted to use a payment method corresponding to the payment card information.

8. The method of claim 1, wherein the supplemental transaction metadata comprises information regarding one or more items to be purchased via the payment card transaction, and wherein the determined one or more reasons are based on one or more of:
   an identity of the one or more items;
   a quantity of the one or more items;
   whether the one or more items comprise a gift card;
   a price associated with the one or more items; or
   whether the one or more items are regularly ordered by a customer associated with the payment card information.

9. The method of claim 1, wherein determining whether the payment card transaction is authorized comprises determining that the payment card transaction is associated with delivery of an item to a location, and wherein the determined one or more reasons comprise an indication of the location.

10. The method of claim 1, wherein the payment processing service is a payment network associated with the payment card information.

11. A data share computing device configured to provide information corresponding to one or more reasons relating to an authorization decision for a payment card transaction between a merchant and a user, the data share computing device comprising:
one or more processors, and
memory storing instructions that, when executed by one or more processors, cause the data share computing device to:
receive, from a merchant device and via a first application programming interface (API), supplemental transaction metadata comprising one or more data elements corresponding to one or more attributes of the payment card transaction, wherein the supplemental transaction metadata is associated with a concurrent transmission of payment card information, for the payment card transaction, by the merchant device to a payment processing service;
store, in a database, at least a portion of the supplemental transaction metadata;
receive, via a second interface different from the first API and from the payment processing service, payment card authorization information corresponding to the payment card transaction, wherein the payment card authorization information indicates whether the payment card information was approved by the payment processing service;
determine, based on timing requirements of the payment processing service and based on the supplemental transaction metadata received from the merchant device and the payment card authorization information received from the payment processing service, whether the payment card transaction is authorized;
determine one or more reasons why the payment card transaction was or was not authorized;
send, to the merchant device and based on the payment card authorization information and the supplemental transaction metadata, an authorization decision indicating whether the payment card transaction was authorized;
receive, from the merchant device, a request for additional information, wherein the request for additional information comprises a reference identification (ID);
determine information corresponding to the determined one or more reasons by retrieving, from the database and based on the reference ID, the at least the portion of the supplemental transaction metadata; and
send, to the merchant device and in response to the request for additional information, the information corresponding to the determined one or more reasons.

12. The data share computing device of claim 11, wherein the instructions, when executed by the one or more processors, cause the data share computing device to determine the information corresponding to the determined one or more reasons by querying the database using the reference ID.

13. The data share computing device of claim 11, wherein the reference ID uniquely identifies the payment card transaction.

14. The data share computing device of claim 11, wherein the instructions, when executed by the one or more processors, cause the data share computing device to send the information corresponding to the determined one or more reasons by causing the data share computing device to:
obfuscate, from the information, personal data.

15. The data share computing device of claim 11, wherein the instructions, when executed by the one or more processors, cause the data share computing device to:
receive credentials unique to the merchant, wherein the instructions, when executed by the one or more processors, cause the data share computing device to send the information corresponding to the determined one or more reasons based on authenticating the credentials.

16. One or more non-transitory computer-readable media storing instructions that, when executed by one or more processors, cause a computing device to provide information corresponding to one or more reasons relating to an authorization decision for a payment card transaction between a merchant and a user by causing the computing device to perform steps comprising:
receiving, by the computing device and from a merchant device via a first application programming interface (API), supplemental transaction metadata comprising one or more data elements corresponding to one or more attributes of the payment card transaction, wherein the supplemental transaction metadata is associated with a concurrent transmission of payment card information, for the payment card transaction, by the merchant device to a payment processing service;
storing, by the computing device and in a database, at least a portion of the supplemental transaction metadata;
receiving, by the computing device and from the payment processing service via a second interface different from the first API, payment card authorization information corresponding to the payment card transaction, wherein the payment card authorization information indicates whether the payment card information was approved by the payment processing service;
determining, by the computing device, based on timing requirements of the payment processing service, and based on the supplemental transaction metadata received from the merchant device and the payment card authorization information received from the payment processing service, whether the payment card transaction is authorized;
determining, by the computing device, one or more reasons why the payment card transaction was or was not authorized;
sending, by the computing device, to the merchant device, and based on the payment card authorization information and the supplemental transaction metadata, an authorization decision indicating whether the payment card transaction was authorized;
receiving, by the computing device and from the merchant device, a request for additional information, wherein the request for additional information comprises a reference identification (ID);
determining information corresponding to the determined one or more reasons by retrieving, from the database and based on the reference ID, the at least the portion of the supplemental transaction metadata; and sending, by the computing device, to the merchant device, and in response to the request for additional information, the information corresponding to the determined one or more reasons.

17. The computer-readable media of claim 16, wherein the instructions, when executed by the one or more processors, further cause the computing device to determine the information corresponding to the determined one or more reasons by causing the computing device to query the database using the reference ID.

18. The computer-readable media of claim 16, wherein reference ID uniquely identifies the payment card transaction.

19. The computer-readable media of claim 16, wherein the instructions, when executed by the one or more processors, further cause the computing device to send the information corresponding to the determined one or more reasons by:
   obfuscating, from the information, personal data.

20. The computer-readable media of claim 16, wherein the instructions, when executed by the one or more processors, further cause the computing device to perform steps comprising:
   receiving credentials unique to the merchant, wherein the instructions, when executed by the one or more processors, further cause the computing device to send the information corresponding to the determined one or more reasons based on authenticating the credentials.

* * * * *